(12) United States Patent
Mei

(10) Patent No.: US 11,420,990 B2
(45) Date of Patent: Aug. 23, 2022

(54) RUTHENIUM COMPLEX CONTAINING ALKYNYL GROUP, METHOD OF SYNTHESIZING THE SAME AND USE THEREOF

(71) Applicant: GUANGDONG PHARMACEUTICAL UNIVERSITY, Guangzhou (CN)

(72) Inventor: Wenjie Mei, Guangzhou (CN)

(73) Assignee: GUANGDONG PHARMACEUTICAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/050,458

(22) PCT Filed: Jan. 25, 2019

(86) PCT No.: PCT/CN2019/073244
§ 371 (c)(1),
(2) Date: Oct. 26, 2020

(87) PCT Pub. No.: WO2019/210715
PCT Pub. Date: Nov. 7, 2019

(65) Prior Publication Data
US 2021/0246154 A1 Aug. 12, 2021

(30) Foreign Application Priority Data

May 4, 2018 (CN) .......................... 201810421070.2

(51) Int. Cl.
*C07F 15/00* (2006.01)
*B01J 31/22* (2006.01)
*C09K 11/06* (2006.01)

(52) U.S. Cl.
CPC ....... *C07F 15/0053* (2013.01); *B01J 31/2295* (2013.01); *C09K 11/06* (2013.01); *B01J 2531/824* (2013.01); *C09K 2211/1074* (2013.01); *C09K 2211/185* (2013.01)

(58) Field of Classification Search
CPC .......................... C07F 15/0053; C07F 15/0046
USPC .................................. 544/225, 342; 546/10
See application file for complete search history.

(56) References Cited

U.S. PATENT DOCUMENTS 9,765,382 B2 * 9/2017 Mei .......................... C09B 57/10

FOREIGN PATENT DOCUMENTS

| CN | 103709202 A | 4/2014 |
| CN | 103788134 A | 5/2014 |
| CN | 105238814 A | 1/2016 |

OTHER PUBLICATIONS

Georgina E. Shillito, et al., Effect of Bridge Alteration on Ground- and Excited-State Properties of Ruthenium(II) Complexes with Electron-Donor-Substituted Dipyrido [3,2-a:2', 3'-c]phenazine Ligands, Inorganic Chemistry, 2016, pp. 11170-11184, vol. 55.
Zhao Zhang, Synthesis, characterization of chiral ruthenium(II) complexes with alkynes as apoptosis inducers, 2014, pp. 1-112.

* cited by examiner

*Primary Examiner* — Charanjit Aulakh
(74) *Attorney, Agent, or Firm* — Bayramoglu Law Offices LLC

(57) ABSTRACT

A Ruthenium complex containing alkynyl group, a method of synthesizing the Ruthenium complex containing alkynyl group and a use thereof are provided. The Ruthenium complex has a chemical formula of Ru(L)$_2$(DPPZ'). DPPZ' is a main ligand having structural formula of

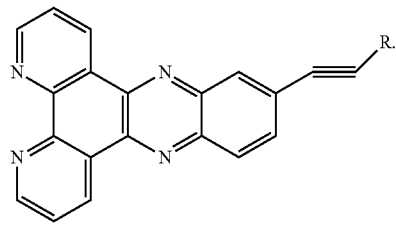

R is any one selected from the group consisting of H, substituted or unsubstituted phenyl, R$_1$NH$_2$, R$_1$OH, and SiMe$_3$; R$_1$ is C1-C5 chain alkyl group; L is an auxiliary ligand with N as coordinating atom. Sonogashira coupling reaction is utilized to introduce alkynyl group into a DPPZ-type Ruthenium complex; the introduced alkynyl group is beneficial to promote the transmembrane absorption of drug molecules, increase the probability of drug entry into cells, and can also increase efficacy and reduce toxic and side effects of drugs. The Ruthenium complex provided has significant anti-tumor activity, especially anti-breast cancer activity, and can provide new ideas for designing anti-tumor drug molecules in the future.

4 Claims, 18 Drawing Sheets

RUTHENIUM COMPLEX CONTAINING ALKYNYL GROUP, METHOD OF SYNTHESIZING THE SAME AND USE THEREOF

CROSS REFERENCE TO THE RELATED APPLICATIONS

This application is the national phase entry of International Application No. PCT/CN2019/073244, filed on Jan. 25, 2019, which is based upon and claims priority to Chinese Patent Application No. 201810421070.2, filed on May 4, 2018, the entire contents of which are incorporated herein by reference.

TECHNICAL FIELD

The present invention relates to the technical field of Ruthenium complex, particularly to a Ruthenium complex containing alkynyl group, a method of synthesizing the Ruthenium complex containing alkynyl group and a use thereof.

BACKGROUND

At present, anti-tumor drugs are used in clinical chemotherapy or adjuvant therapy, but they only have a good effect on the treatment of some tumors, and most drugs are only limited to the relief of diseases. Clinical studies show that most anti-tumor drugs have poor selectivity to cells, when they act on cancer cells, normal cells and tissues are also subject to strong toxic and side effects, adversely affecting clinical application. Therefore, it is the future development trend to explore new drugs, improve efficacy, and reduce toxic and side effects. Ruthenium (II) metal complex has the characteristics of high efficiency, low toxicity, easy absorption and fast excretion, after Platinum complexes, it is considered as the most potential anti-tumor drug in the research and clinical field. Hence, for decades, after making a lot of unremitting efforts by researchers, several clinical drugs with broad-spectrum anti-tumor effects, good therapeutic effect and low toxicity have been developed, and they have even entered the clinical stage, such as NAMI-A and KP1019. With the in-depth research on the mechanism of Ruthenium complexes in inhibiting tumor cell proliferation, more and more, various types of Ruthenium complexes have been reported, wherein the study of coordination mechanism and modifications of various structures for easy transmembrane, high targeting capacity, and low toxicity have become a very important research subject. It is important to research and develop Ruthenium complexes with excellent anti-tumor effect for the treatment of tumors.

In the past few decades, many Ruthenium (II) complexes have been designed, and their inhibitory activities in vivo and in vitro have been extensively studied. For example, $[Ru(bpy)_2(p\text{-tFMPIP})]^{2+}$ (bpy=2,2'-bipyridine, p-tFMPIP=2-(4-(Trifluoromethylphenyl))-1H-imidazo[4,5-f][1,10]phenanthroline) inhibits the growth of a lot of tumors, an increased Ruthenium (II) complex conjugated auxiliary ligand $[Ru(L)_2(BHIP)]^{2+}$ (L=bpy, phen and dip; bpy=2,2'-bipyridine, phen=1,10-phenanthroline, dip=4,7-diphenyl-1,10-phenanthroline; BHIP=2-(3-bromo-4-hydroxyphenyl) imidazo[4,5-f][1,10]phenanthroline) can inhibit the low-toxic growth of breast cancer cells. Additionally, it has also been reported that alkyl chains, polypeptides, porphyrins, and natural products have been used to increase the activity of Ruthenium(II) complexes by promoting the membrane permeability of these complexes. Furthermore, there are a large number of literature reports on the introduction of alkynyl group in the design and synthesis of a drug molecule to increase its activity. Studies find that the introduction of such groups has its own advantages in terms of activity and binding strength. The design of modification by alkynyl group can be seen in common drugs such as estradiol, deoxyuridine, tretinoin, antifungal furanone derivatives and various pyrimidine nucleoside derivatives. Due to the large aromatic binding surface, the Ruthenium complex containing alkynyl group has a more effective transmembrane absorption capacity than the parent Ruthenium complex containing no alkynyl group. As previous studies have proved that alkynyl Ruthenium complexes L- and D-[Ru(bpy)$_2$(p-TEPIP)] (ClO$_4$)$_2$ (bpy=2,2'-bipyridine, p-TEPIP=2-(4-trimethylsilylpropargyl)-1H-imidazo[4,5'][1,10]phenanthroline) can be absorbed more effectively, thereby inhibiting the growth and migration of MDA-MB-231 cells which have high activity. At the same time, we reported that only 5 μM ethynyl Ruthenium complex (L- and D-[Ru(bpy)$_2$(p-BEPIP)](ClO$_4$)$_2$) (bpy=2,2'-bipyridine, p-BEPIP=2-(4-phenylethynylphenyl)-1H-imidazo[4,5f][1,10]phenanthroline) can completely enter into a cell nucleus in just 2 hours, and L-[Ru(bpy)$_2$(p-BEPIP)](ClO$_4$)$_2$ complex can be used as a gene carrier to bring c-myc G-quadruplex into the nucleus of HepG2 tumor cells. In addition, [Ru(phen)$_2$(TMSEPIP)](ClO$_4$)$_2$ (phen=1,10-phenanthroline, TMSEPIP=2-(4-trimethylsilylpropargyl)-1H-imidazo[4,5'][1,10]phenanthroline) and [Ru(phen)$_2$(BEPIP)](ClO$_4$)$_2$ (BEPIP=2-(4-phenylethynylphenyl)-1H-imidazo[4,5f][1,10]phenanthroline) have strong combining capacity with DNA. It can be seen that the alkynyl-modified Ruthenium complex can enhance the compound's transmembrane absorption capacity and has a good application prospect in the research of new anti-tumor drugs.

In previous studies, the polypyridine Ruthenium complex with DPPZ as the main ligand is widely used in cell imaging probes due to its unique and excellent photophysical property and strong combining capacity with DNA. However, the fact of the polypyridine Ruthenium complex with DPPZ as the main ligand theoretically having good anti-tumor activity has been ignored. The main limitation is that DPPZ-type compounds have poor transmembrane absorption and cannot enter into the nucleus of tumor cells across the membrane. Moreover, in 2011, Ott et al. finds that the amount of Ruthenium complex absorbed by tumor cells has a great influence on its corresponding activity. For example, although $[Ru(bpy)_2(dppz)]^{2+}$ has strong combining capacity with DNA, it shows insignificant cytotoxicity to cancer cells.

SUMMARY

The purpose of the present invention is to provide an alkynyl-modified Ruthenium (II) complex with DPPZ as the main ligand, and a method of synthesizing the same and a use thereof, based on the development of existing Ruthenium complexes. The Ruthenium complex containing alkynyl group that the inventor intends to design has its special advantages in anti-tumor, thus a series of compounds with good purity have been synthesized. Additionally, racemic compounds, levorotatory compounds, and dextrorotatory compounds were used as the precursors of the complexes, so as to study the selectivity and drug properties of ligands with different configurations.

For achieving this objective, the present invention adopts the following technical solutions:

A first aspect of the present invention provides a Ruthenium complex containing alkynyl group, having a chemical formula of Ru(L)$_2$(DPPZ'); wherein, DPPZ' is a main ligand, and its structural formula (I) is as follows:

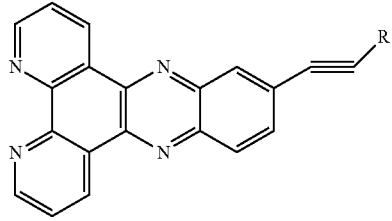

(I)

wherein, R is selected from any one of the following: H, substituted or unsubstituted phenyl, R$_1$NH$_2$, R$_1$OH, SiMe$_3$;

wherein, R$_1$ is C1-C5 chain alkyl group;

wherein, L is an auxiliary ligand with N as coordinating atom.

Preferably, in the abovementioned Ruthenium complex containing alkynyl group, L is 2,2'-bipyridine or 1,10-phenanthroline.

Preferably, in the abovementioned Ruthenium complex containing alkynyl group, the Ruthenium complex containing alkynyl group is selected from any one of the following:

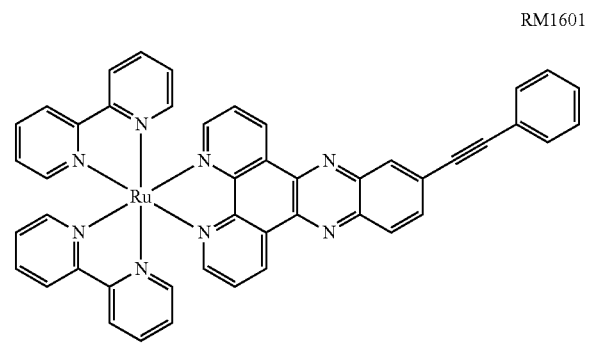

RM1601

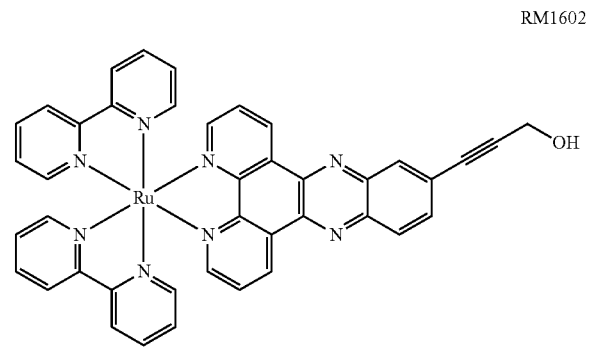

RM1602

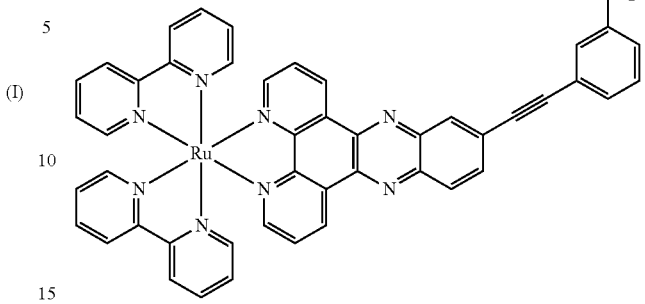

RM1603

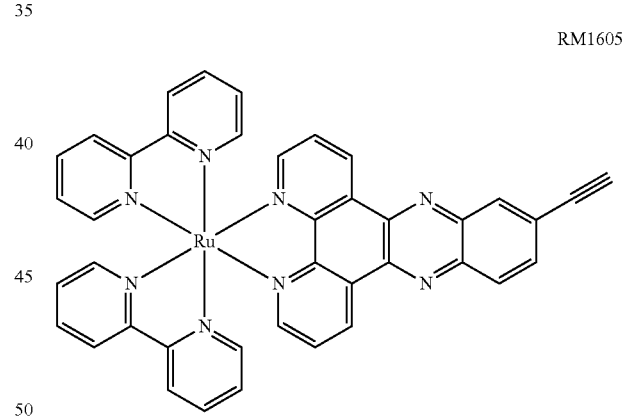

RM1604

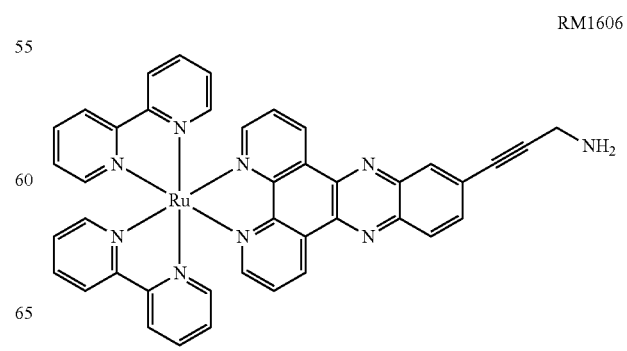

RM1605

RM1606

LRM1601
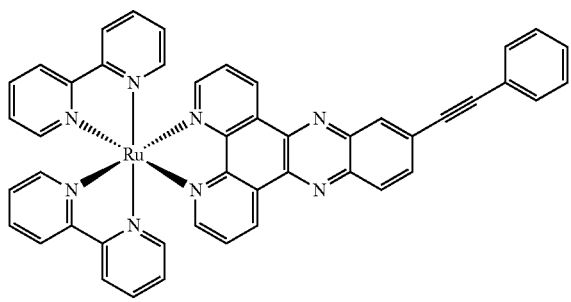
DRM1601
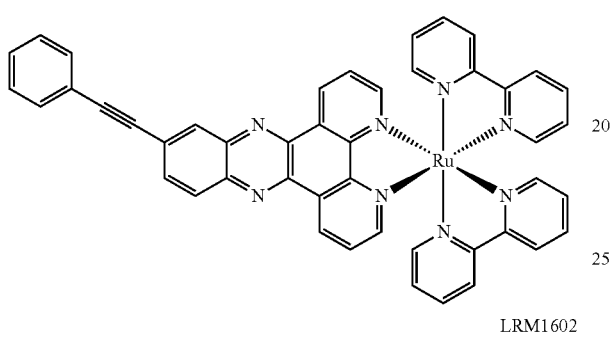
LRM1602
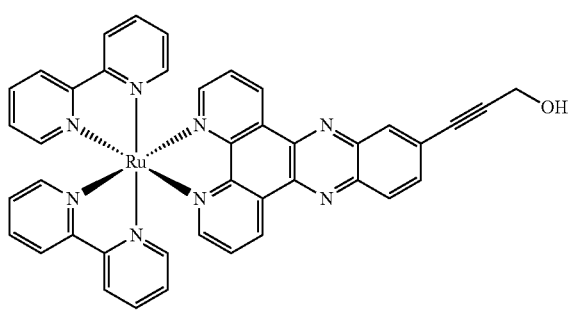
DRM1602
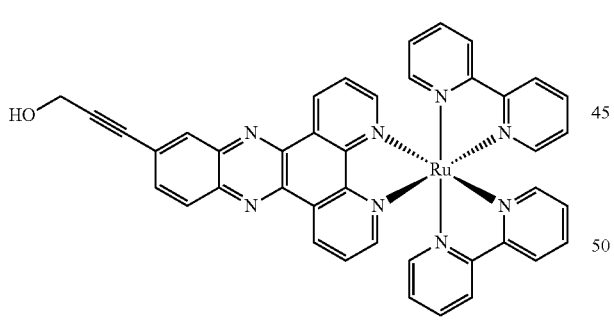
LRM1603
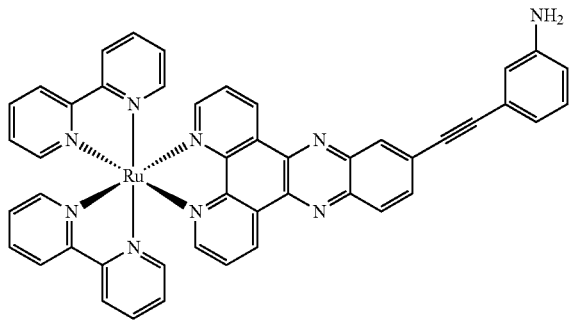
DRM1603
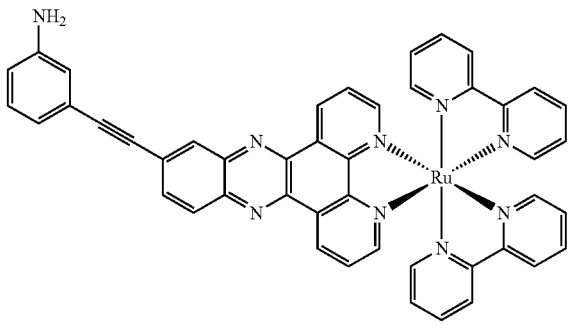
LRM1604
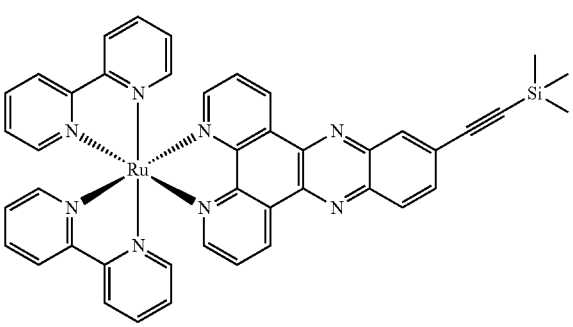
DRM1604
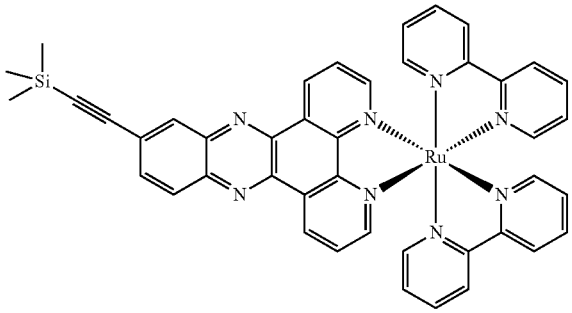
LRM1605
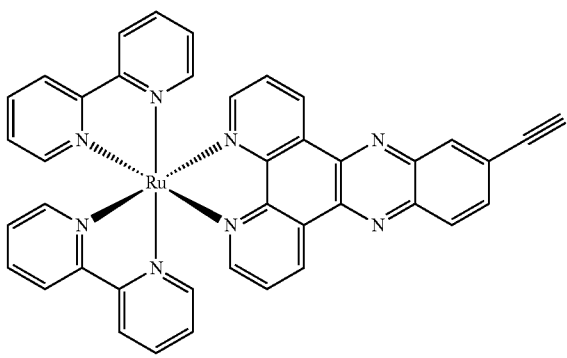

DRM1605
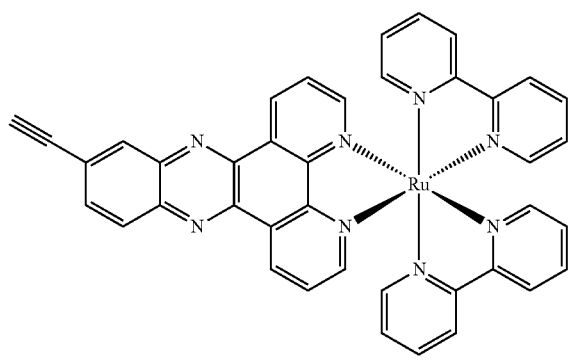
RPM1602
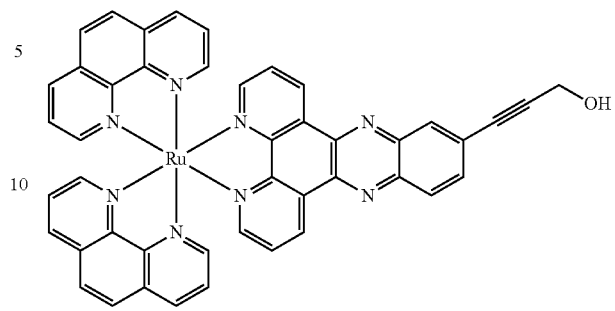
LRM1606
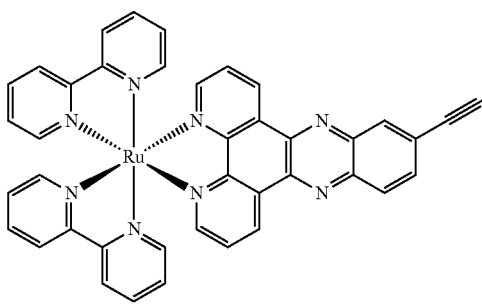
RPM1603
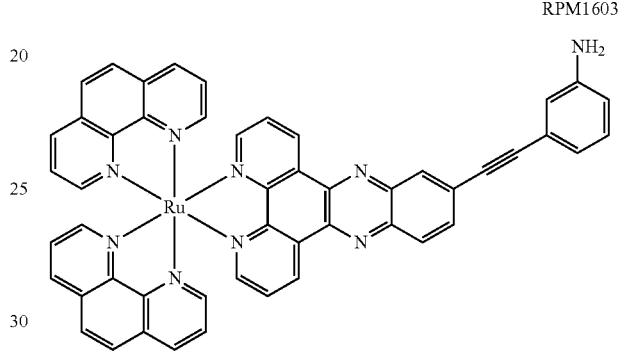
DRM1606
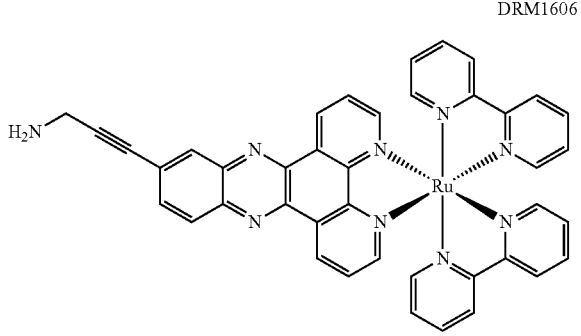
RPM1604
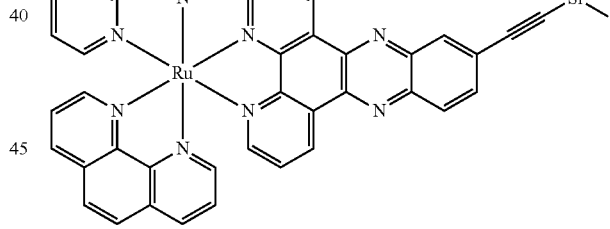
RPM1601
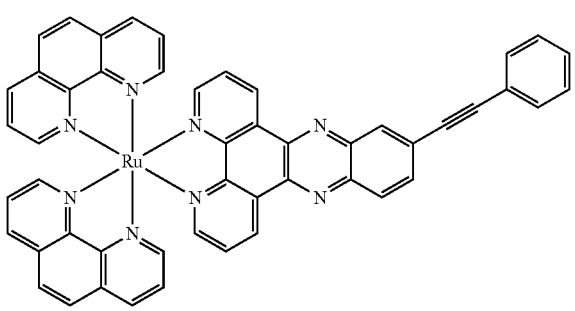
RPM1605
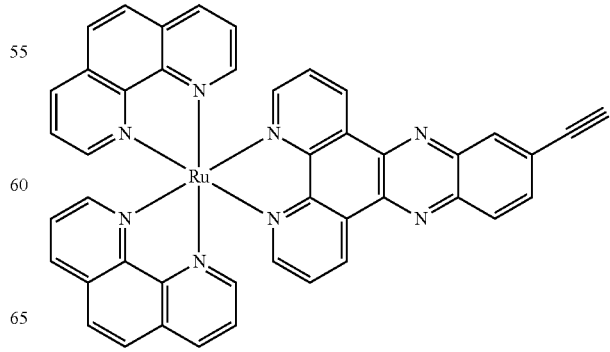

-continued

RPM1606

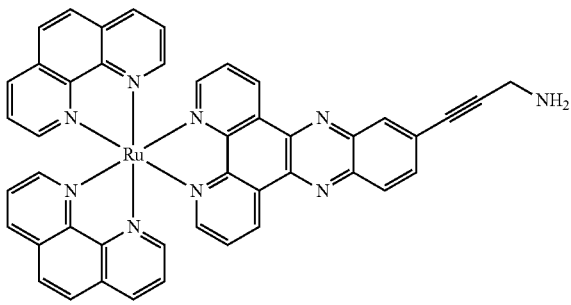

A second aspect of the present invention provides a method of synthesizing the Ruthenium complex containing alkynyl group according to the first aspect, comprising following steps:

S1: adding Br-DPPZ, [Ru(L)$_2$Cl$_2$].nH$_2$O or L-[Ru(L)$_2$(py)$_2$].mH$_2$O or D-[Ru(L)$_2$(py)$_2$].mH$_2$O and a mixed solvent to a reaction vessel; afterwards, heating and refluxing for reaction, when the reaction is complete, post-processing to obtain an intermediate; wherein py represents pyridine, each of n and m is an integer, independently;

S2: adding the intermediate prepared in S1 into a microwave reaction tube, and adding anhydrous acetonitrile, and performing ultrasonic treatment to dissolve the intermediate; afterwards, under the protection of an inert gas, first adding triethylamine and

and then immediately adding Pd(PPh$_3$)$_2$Cl$_2$ and CuI; after sealing the microwave reaction tube, putting it into a microwave reactor for microwave assisted heating, when the reaction is complete, post-processing to obtain the Ruthenium complex containing alkynyl group.

Preferably, in S1 of the abovementioned method, the mixed solvent is ethylene glycol and water.

More preferably, in S1 of the abovementioned method, the volume ratio of the ethylene glycol and the water is 9:1.

Preferably, in S2 of the abovementioned method, the inert gas is nitrogen or argon.

Furthermore, a third aspect of the present invention provides a use of the Ruthenium complex containing alkynyl group according to the first aspect in preparation of drugs for therapy of cancers.

At the same time, a fourth aspect of the present invention also provides a use of the Ruthenium complex containing alkynyl group according to the first aspect as a fluorescence probe.

In conclusion, the technical solutions provided by the present invention have following beneficial effects: (1) the Ruthenium complex containing alkynyl group is a new type of Ruthenium complexes; Sonogashira coupling reaction is utilized to introduce alkynyl group into a DPPZ-type Ruthenium complex, wherein the introduced alkynyl group is beneficial to promote the transmembrane absorption of drug molecules, increase the probability of drug entry into cells, and can also increase efficacy and reduce toxic and side effects of drugs; (2) the Ruthenium complex containing alkynyl group provided by the present invention has significant anti-tumor activity, especially anti-breast cancer activity, and can provide new ideas for designing anti-tumor drug molecules in the future; (3) the Ruthenium complex containing alkynyl group provided by the present invention can also be used as a fluorescence probe. In summary, the Ruthenium complex containing alkynyl group has broad application prospects in the field of medicinal chemistry.

BRIEF DESCRIPTION OF THE DRAWINGS

The present invention will be further described below with reference to the accompanying drawings.

DETAILED DESCRIPTION OF THE EMBODIMENTS

Figure 1:
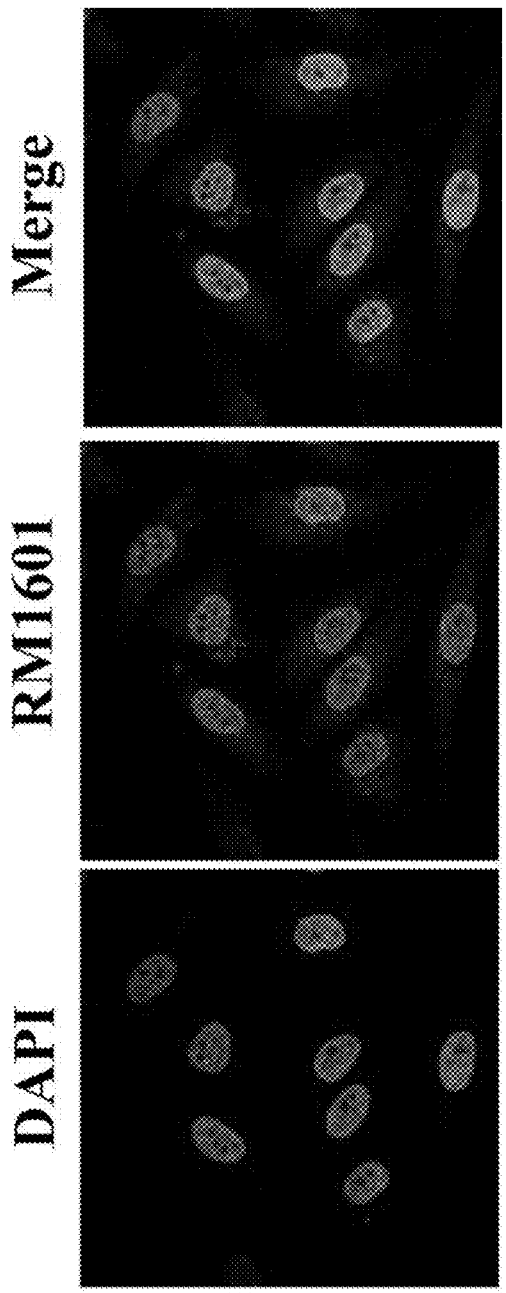
FIG. 1 is a fluorescence image measured when RM1601 is used as a fluorescence probe; wherein the blue represents DAPI, and the red represents the Ruthenium (II) complex containing alkynyl group; [Ru]=20 μM.
Figure 2:
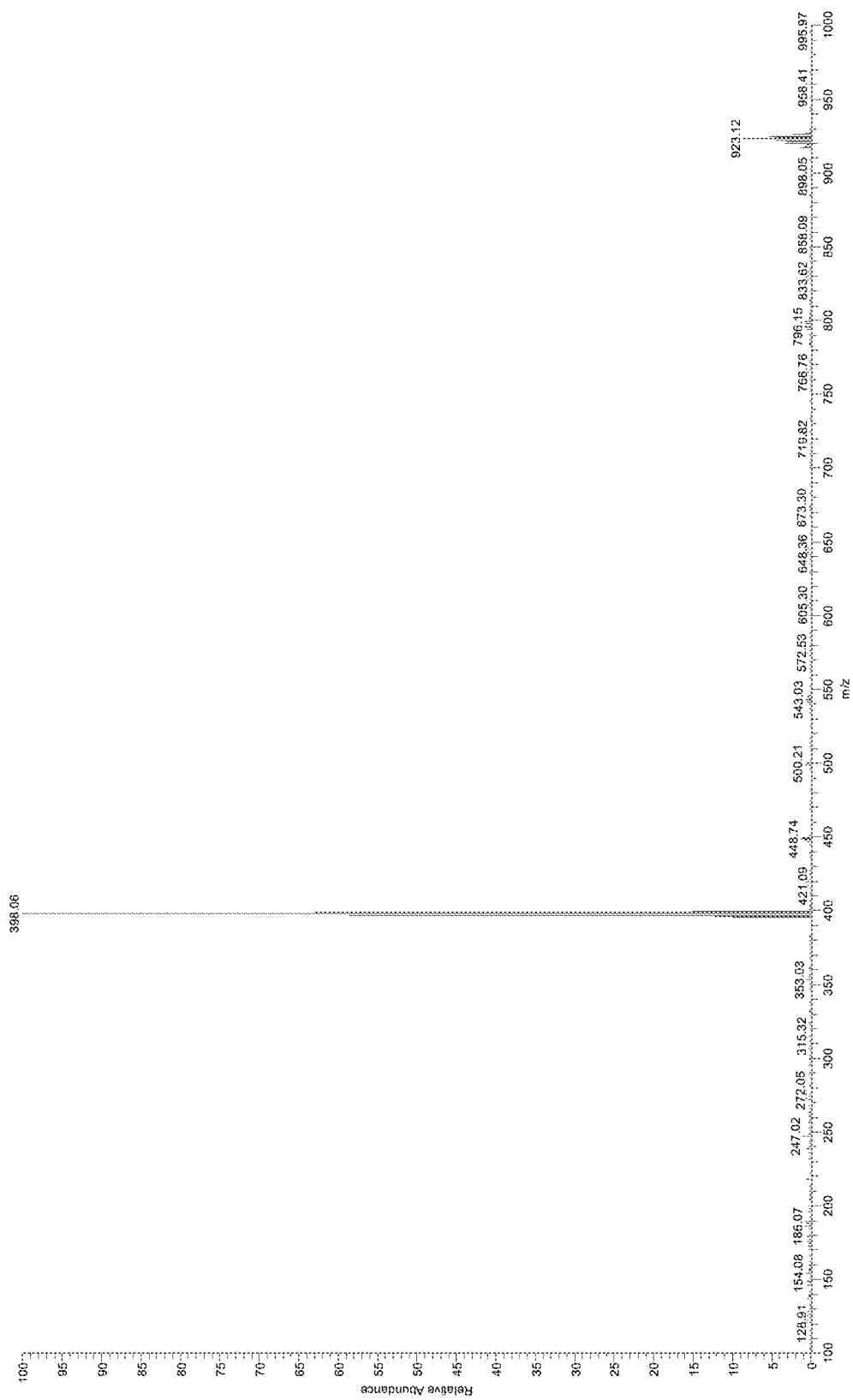
FIG. 2 is a mass spectrum of RM1601.
Figure 3:
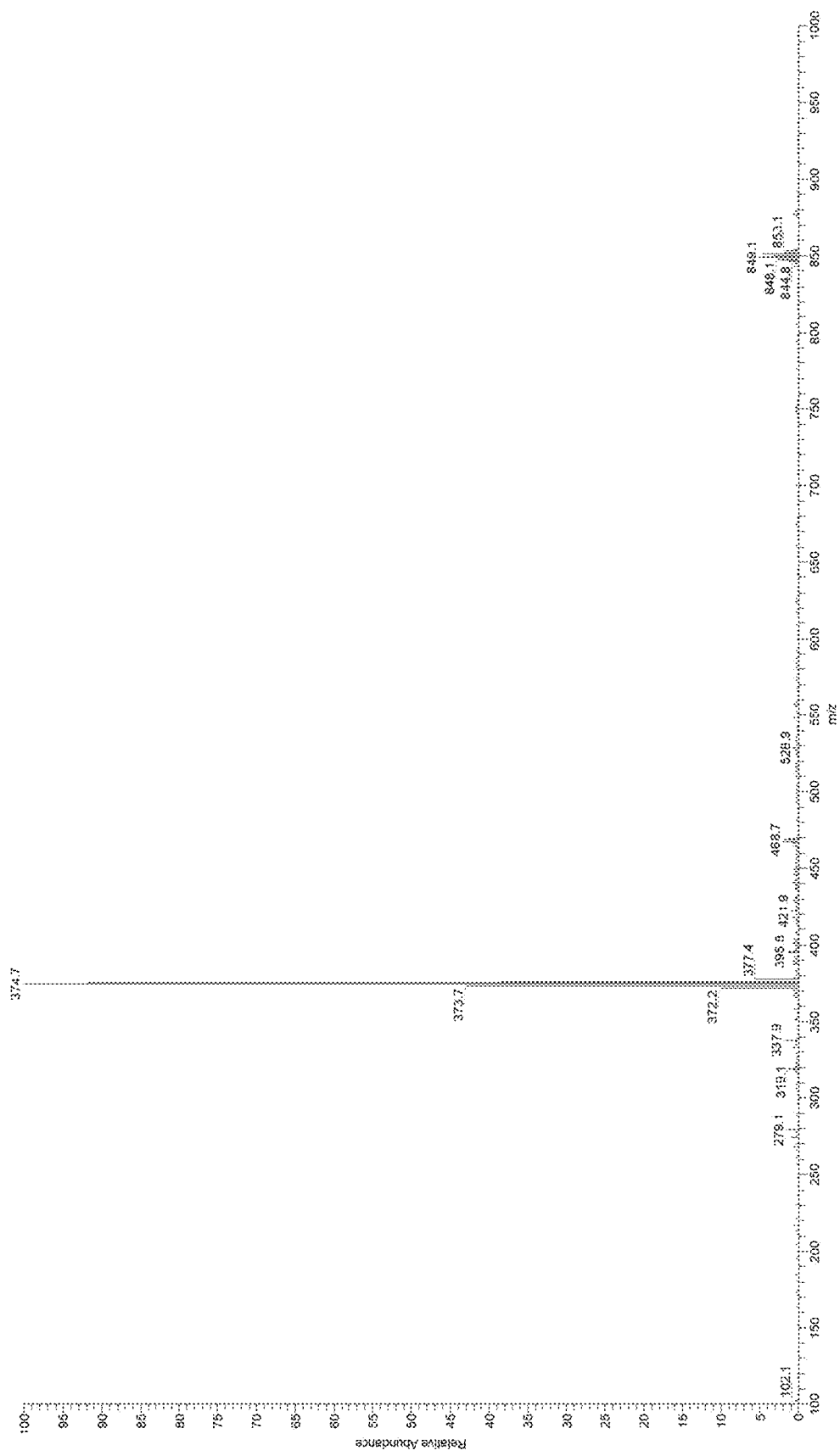
FIG. 3 is a mass spectrum of RM1602.
Figure 4:
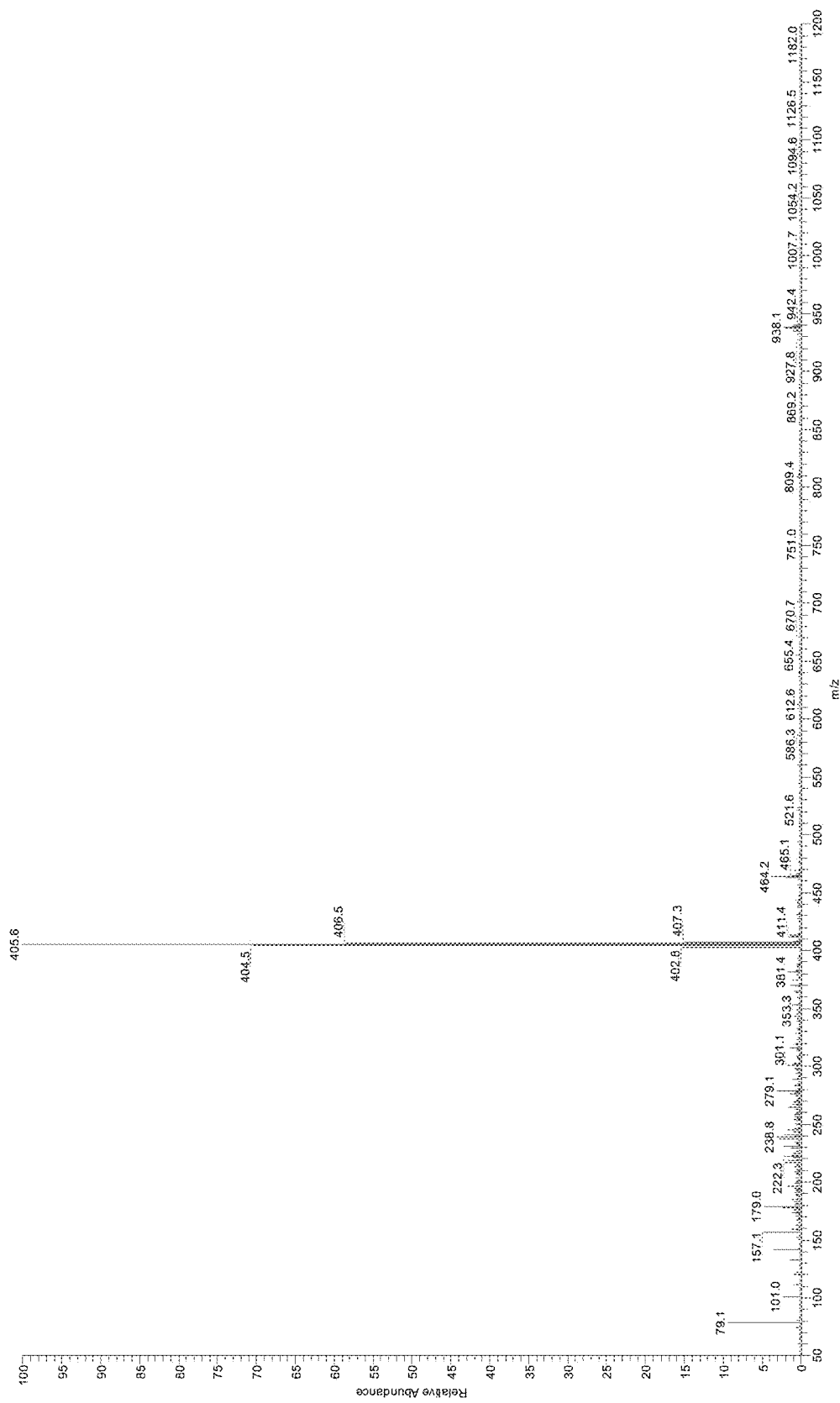
FIG. 4 is a mass spectrum of RM1603.
Figure 5:
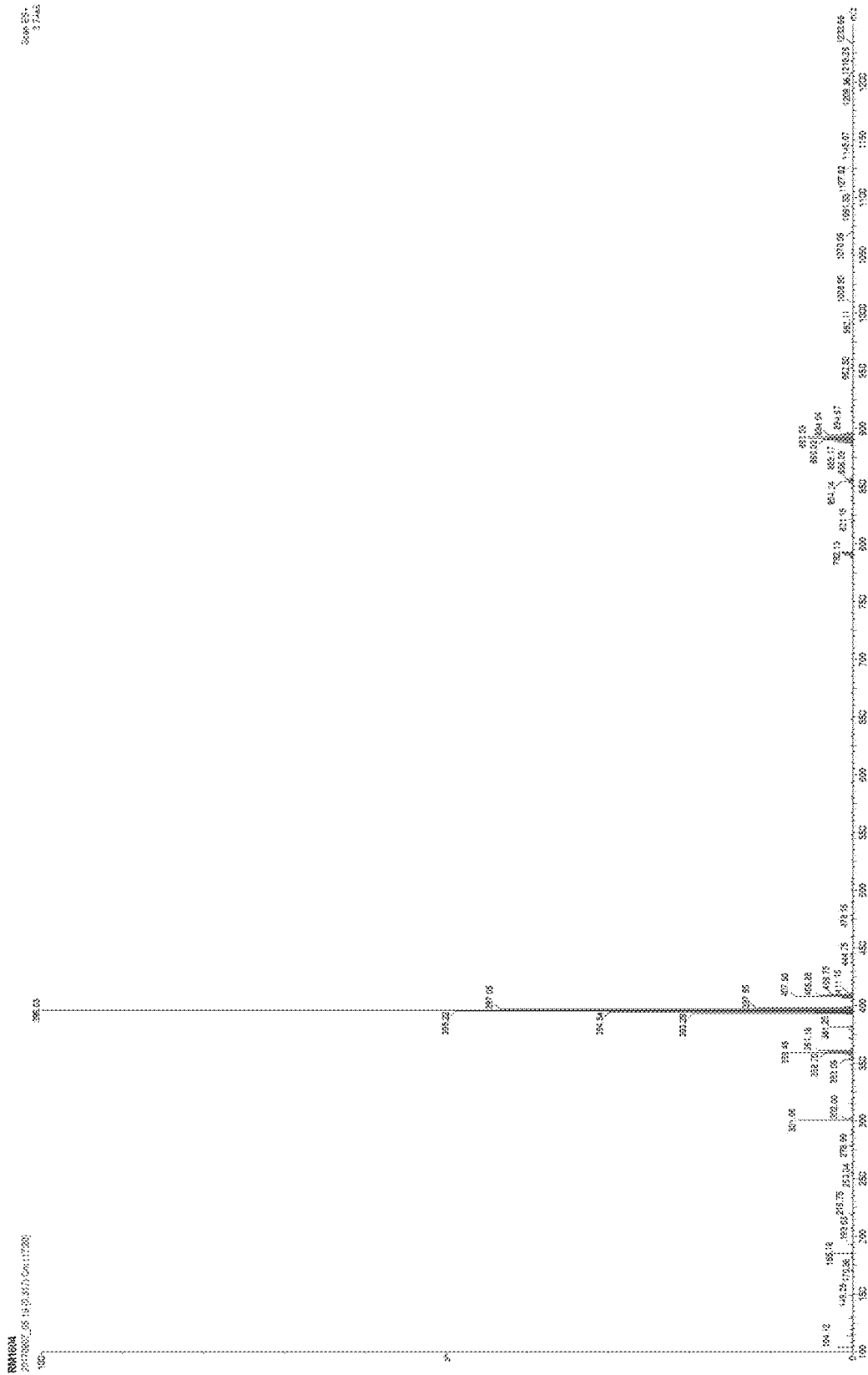
FIG. 5 is a mass spectrum of RM1604.
Figure 6:
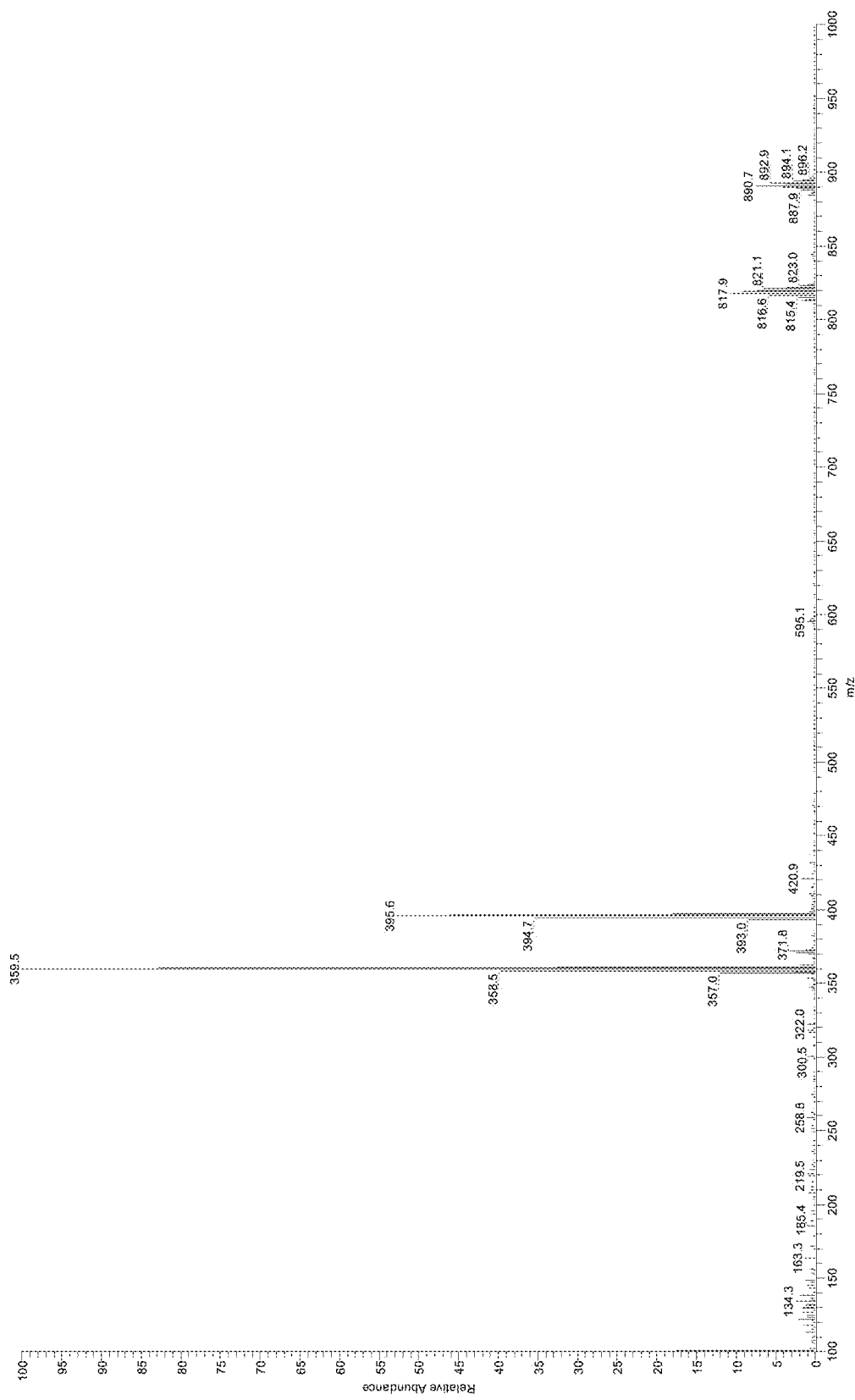
FIG. 6 is a mass spectrum of RM1605.
Figure 7:
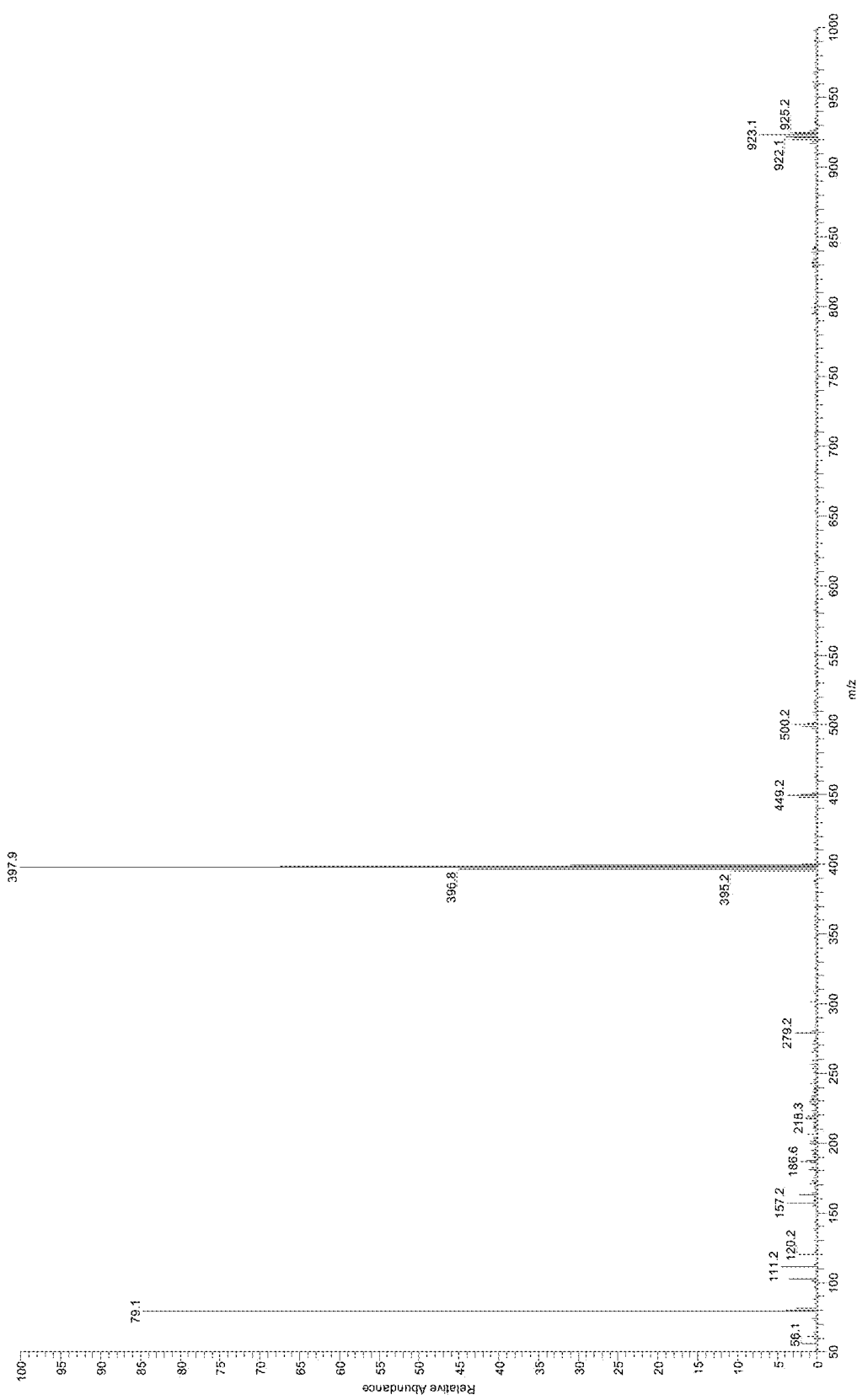
FIG. 7 is a mass spectrum of LRM1601.
Figure 8:
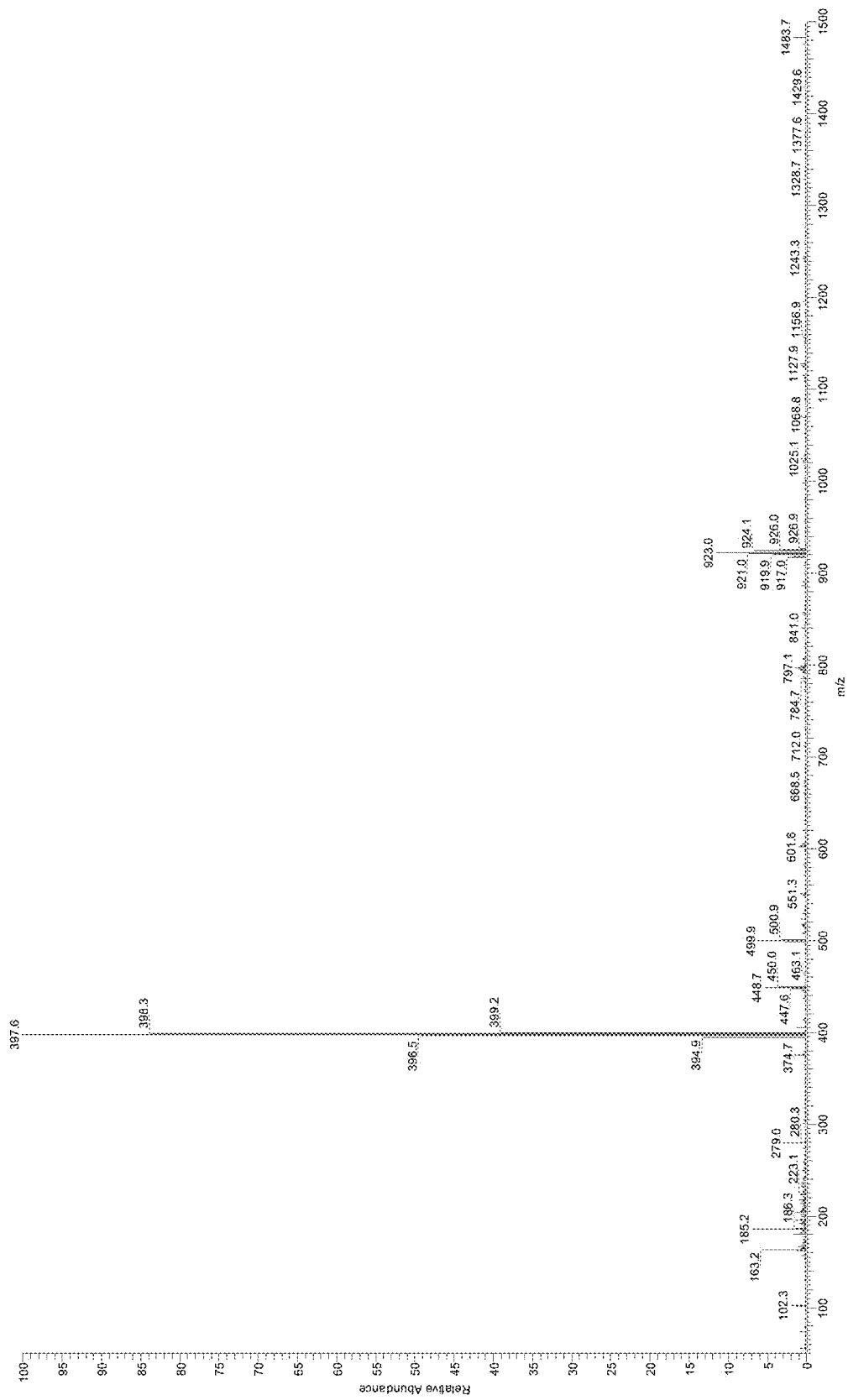
FIG. 8 is a mass spectrum of DRM1601.
Figure 9:
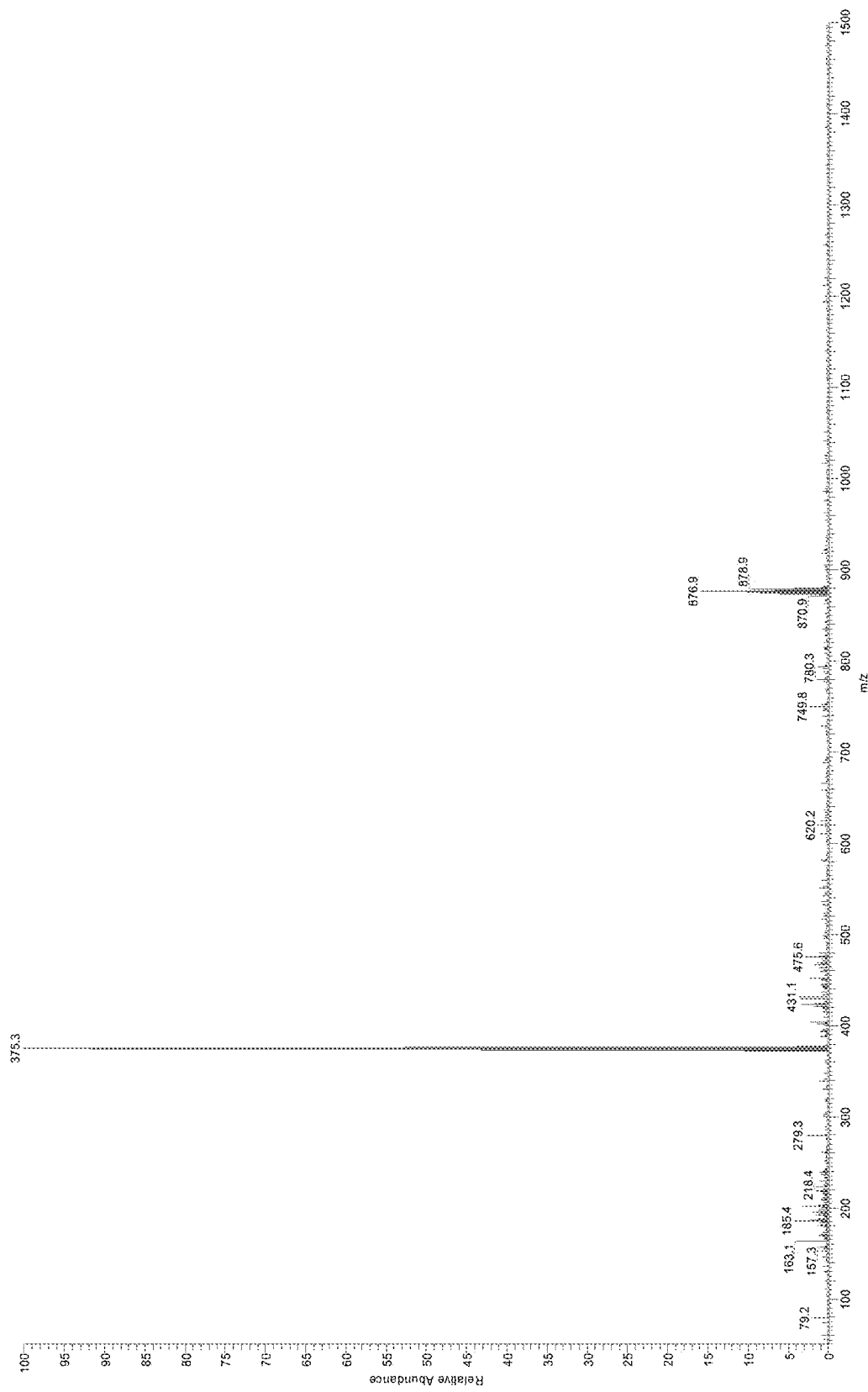
FIG. 9 is a mass spectrum of LRM1602.
Figure 10:
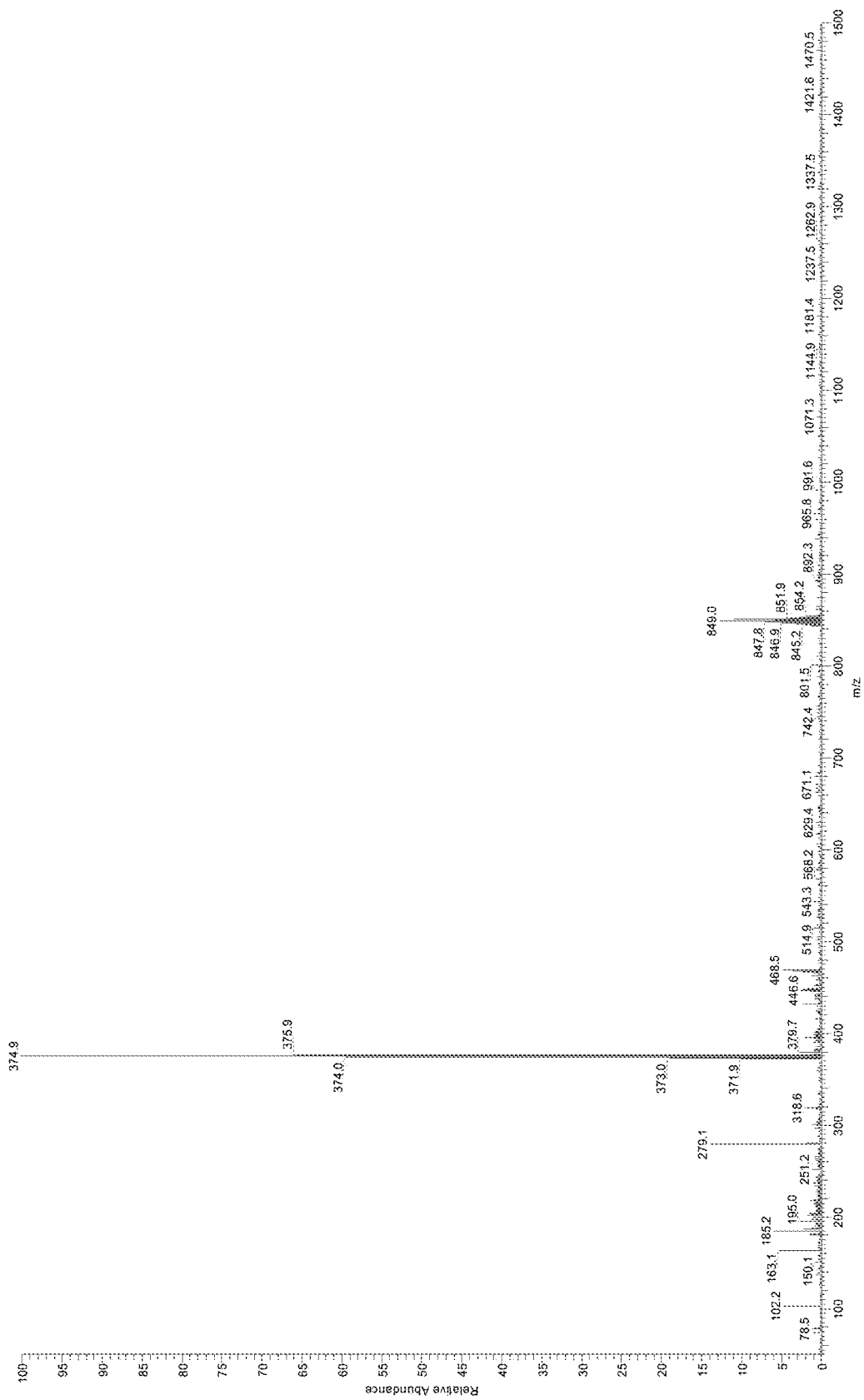
FIG. 10 is a mass spectrum of DRM1602.
Figure 11:
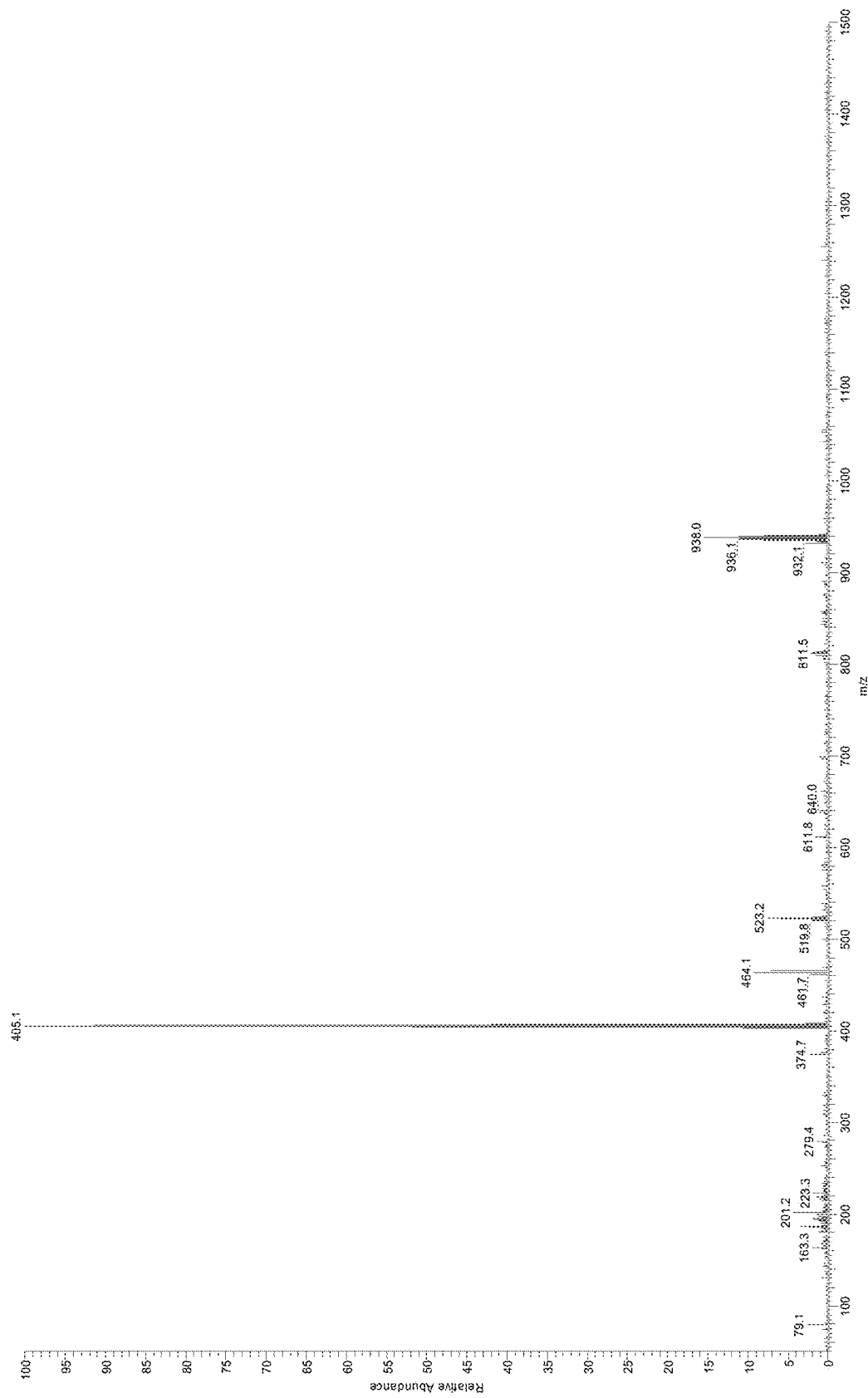
FIG. 11 is a mass spectrum of LRM1603.
Figure 12:
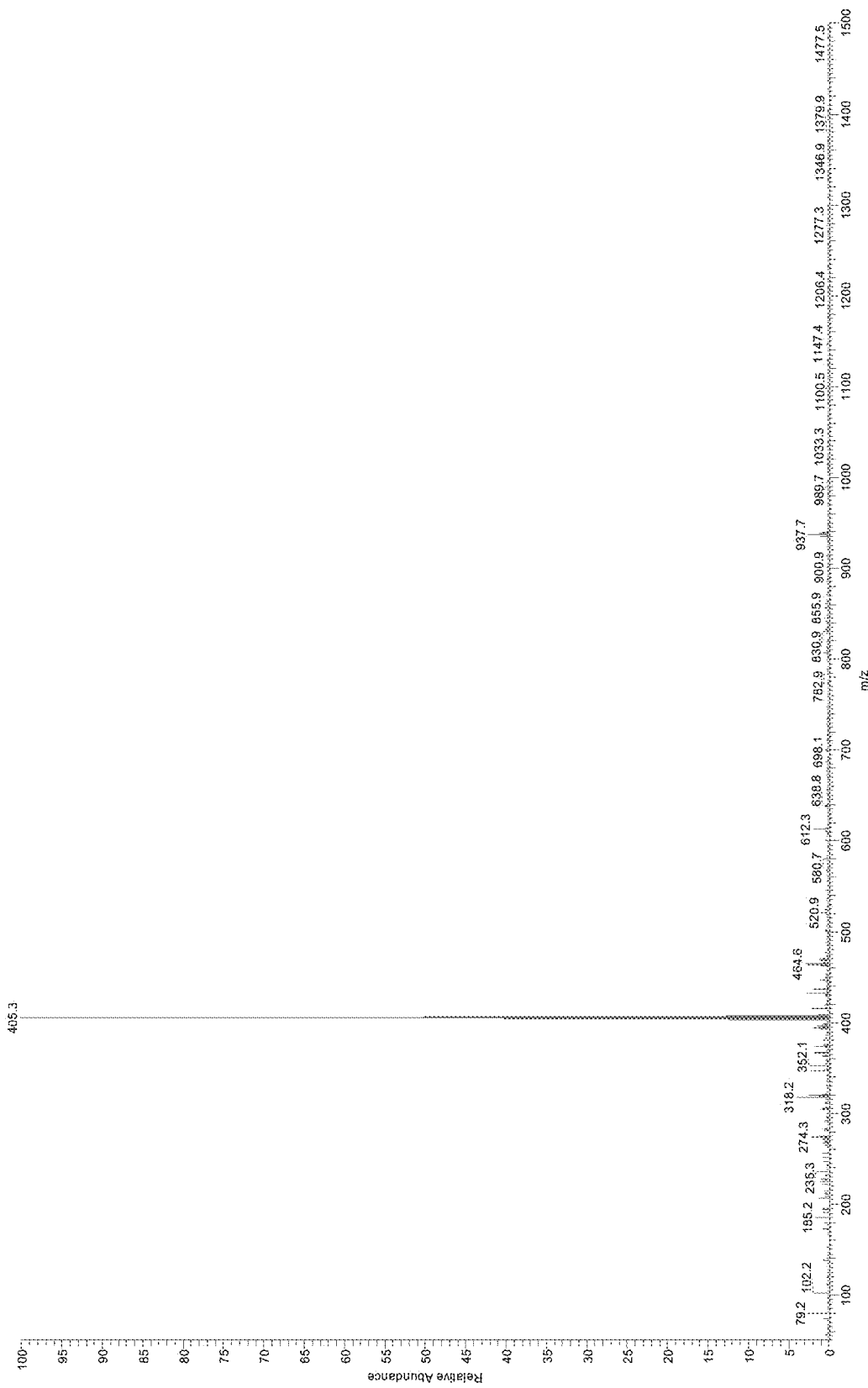
FIG. 12 is a mass spectrum of DRM1603.
Figure 13:
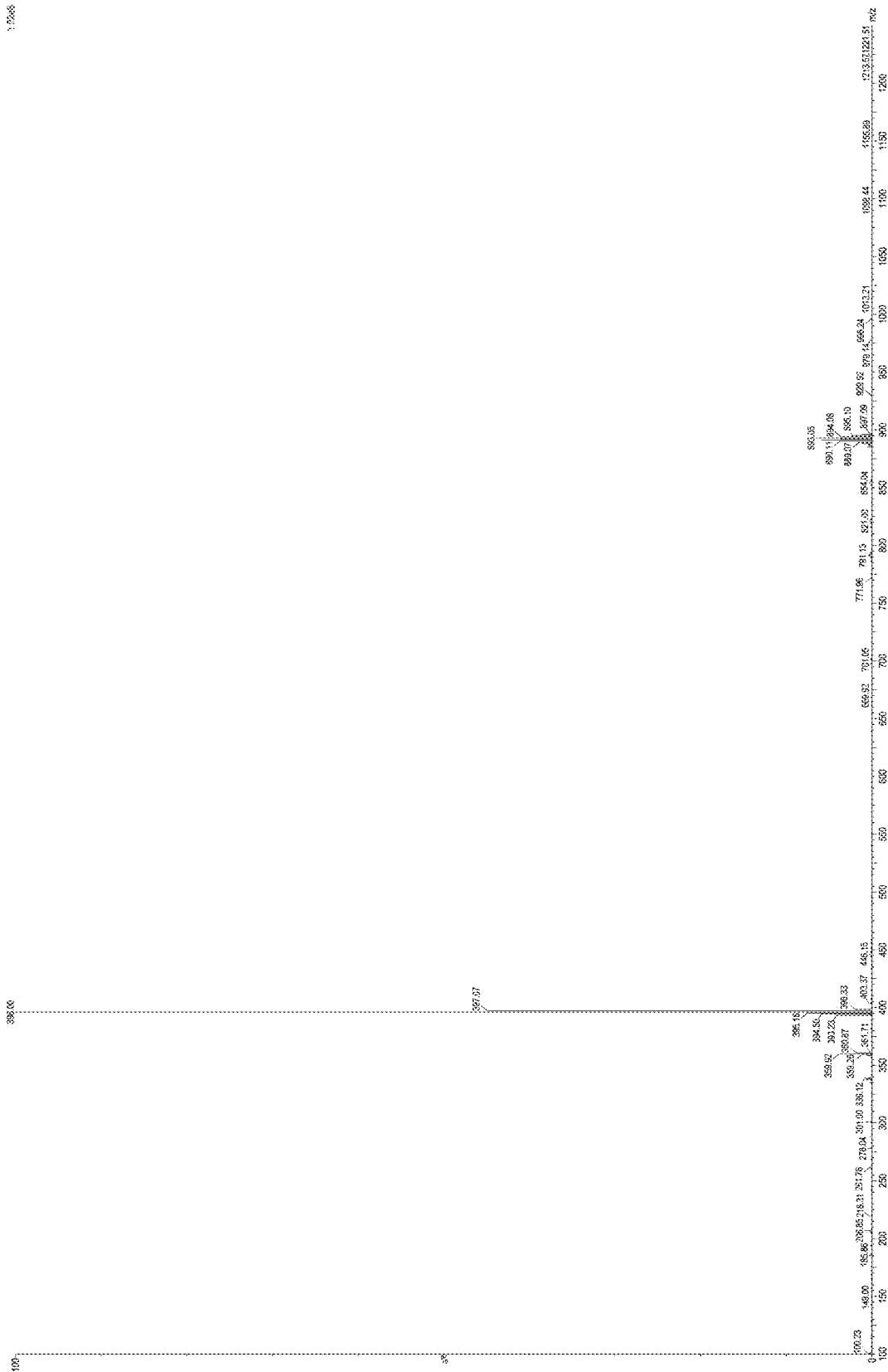
FIG. 13 is a mass spectrum of LRM1604.
Figure 14:
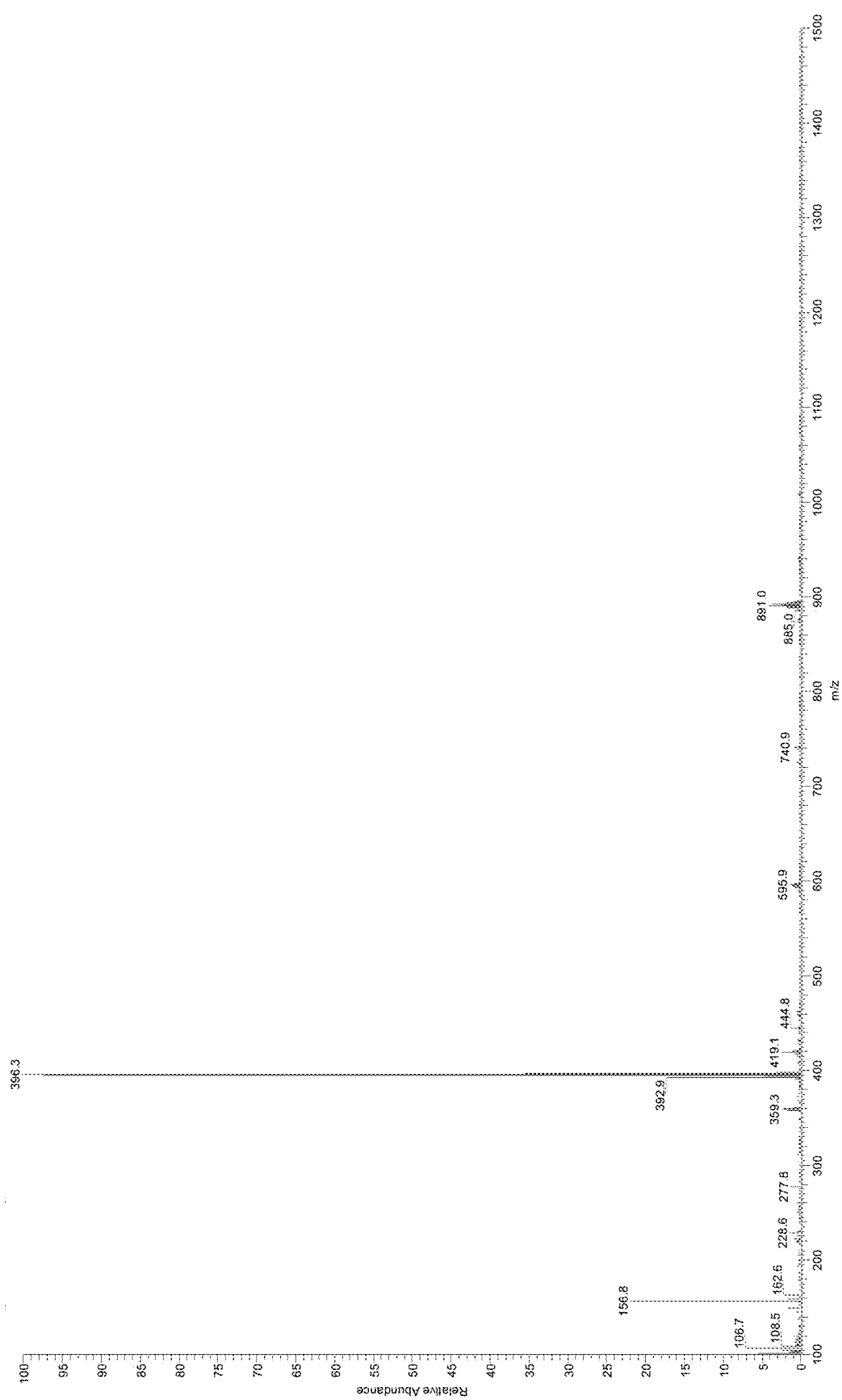
FIG. 14 is a mass spectrum of DRM1604.
Figure 15:
FIG. 15 is a mass spectrum of RPM1601.
Figure 16:
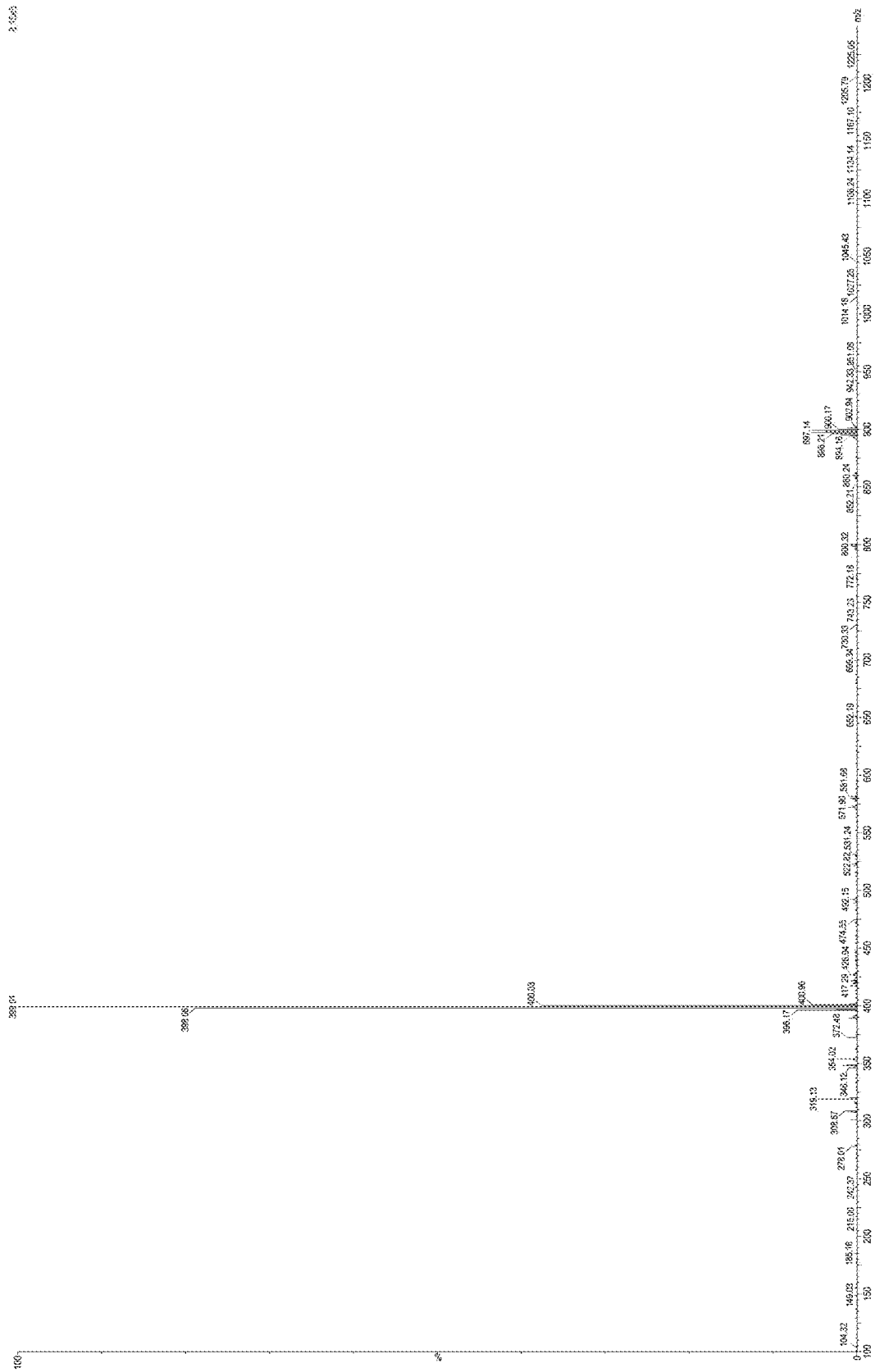
FIG. 16 is a mass spectrum of RPM1602.
Figure 17:
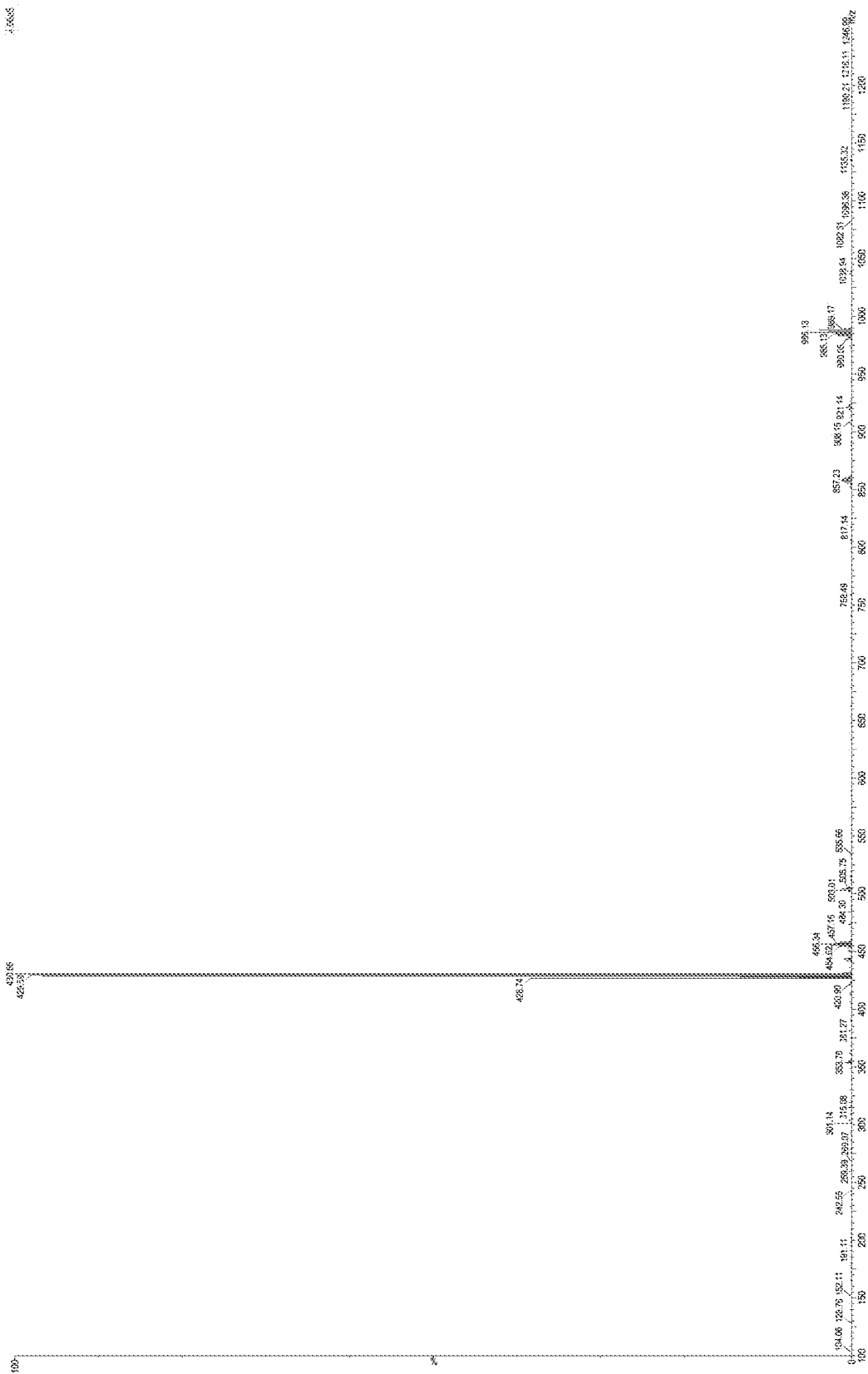
FIG. 17 is a mass spectrum of RPM1603.
Figure 18:
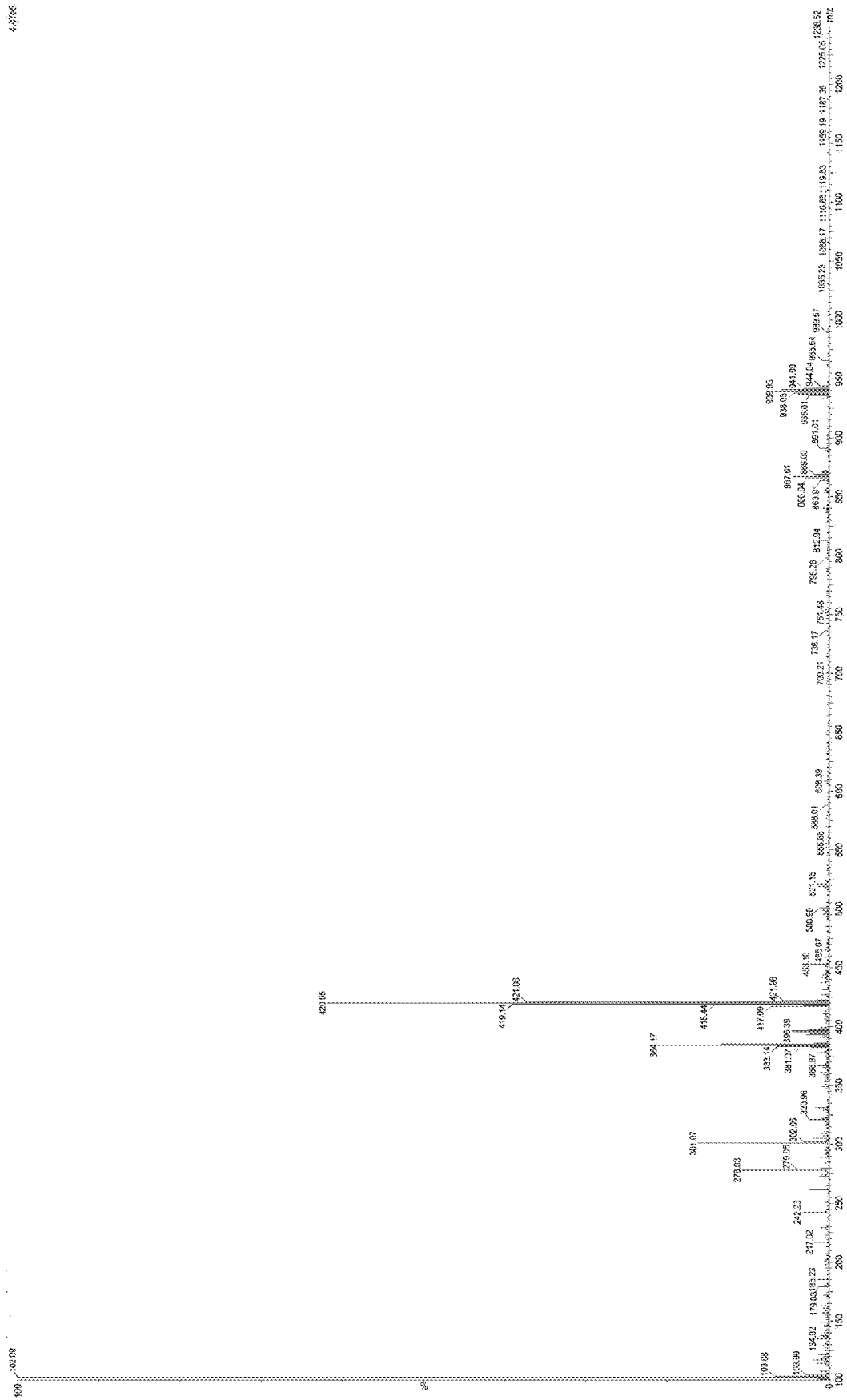
FIG. 18 is a mass spectrum of RPM1604.

1. The Molecular Structure and Number of the Designed Compound 1.1. The Molecular Structure and Number of the Ligand

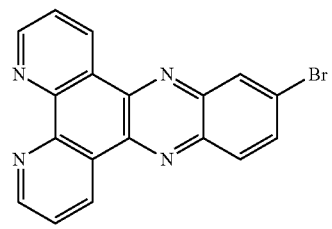

BrDPPZ

1.2. The Molecular Structure and Number of DPPZ Alkynyl Ruthenium Complex
1.2.1. The Molecular Structure and Number of Racemic Bipyridine DPPZ Alkynyl Ruthenium Complex
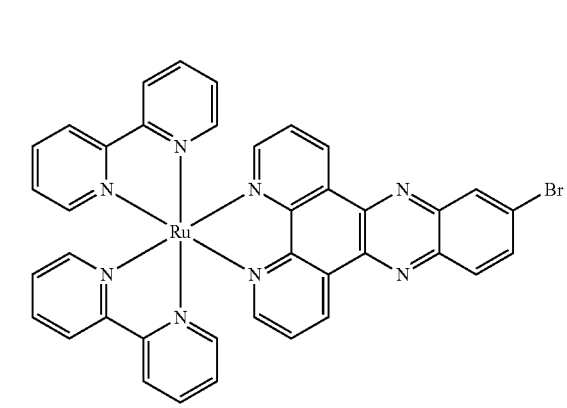
[Ru(bpy)$_2$(BrDPPZ)]$^{2+}$
RM1601
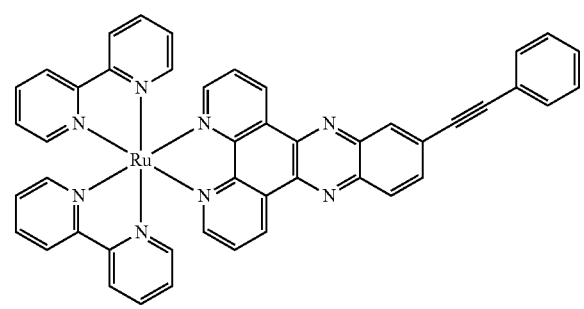
RM1602
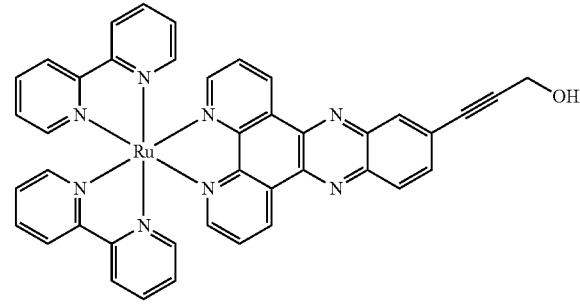
RM1603
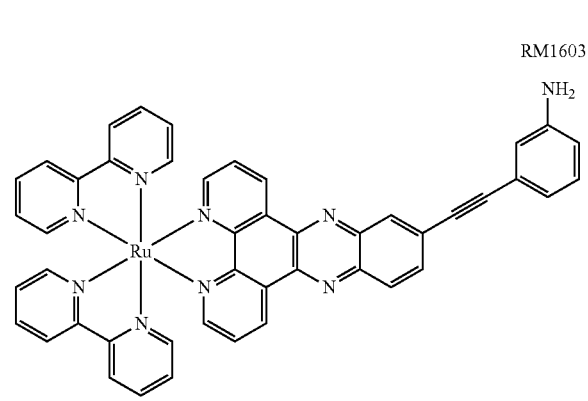
RM1604
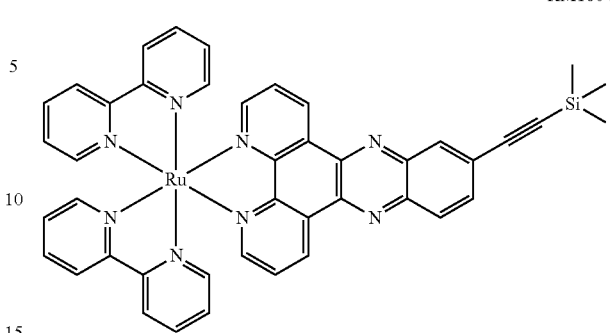
RM1605
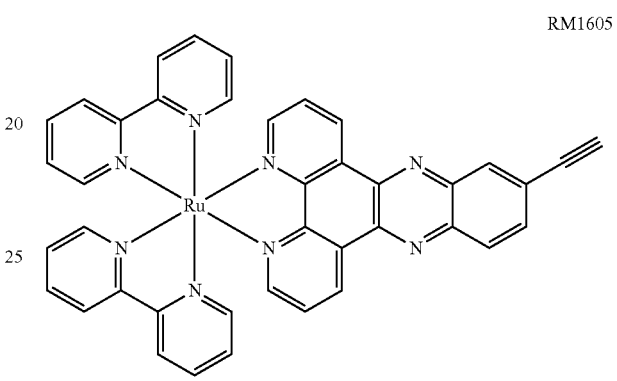
RM1606
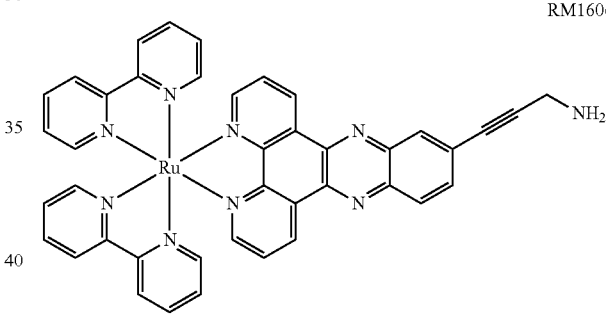
1.2.2. The Molecular Structure and Number of Chiral Bipyridine DPPZ Alkynyl Ruthenium Complex
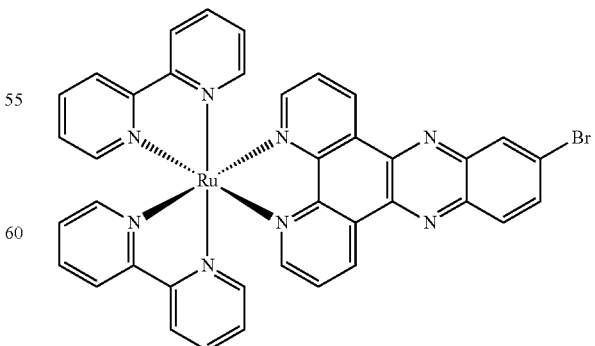
L[Ru(bpy)$_2$(BrDPPZ)]$^{2+}$

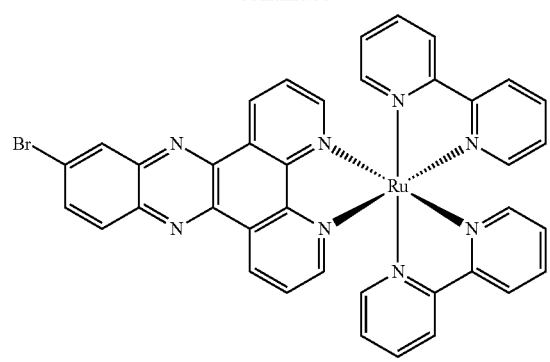
D[Ru(bpy)$_2$(BrDPPZ)]$^{2+}$
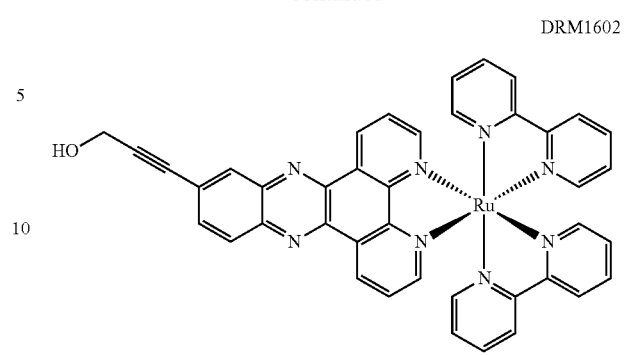
DRM1602
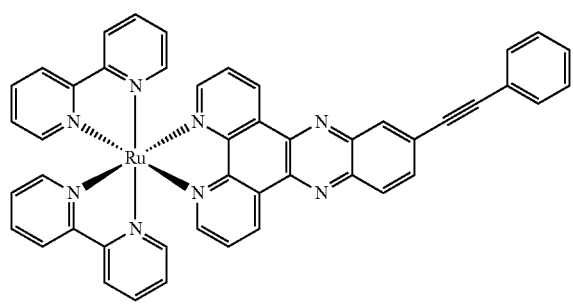
LRM1601
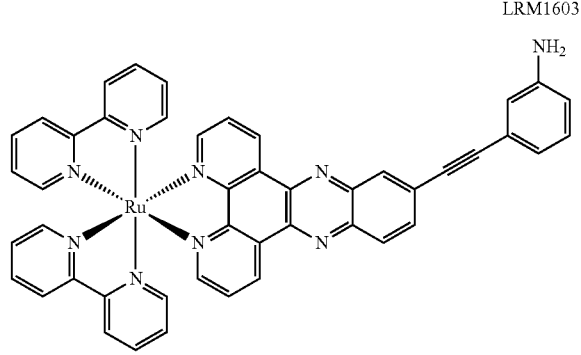
LRM1603
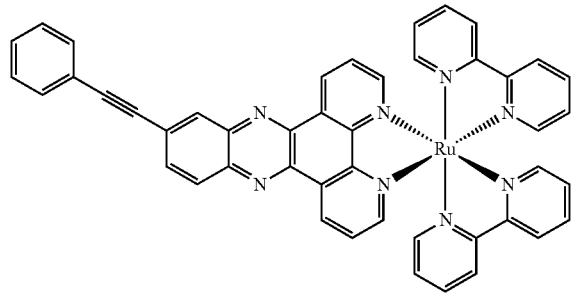
DRM1601
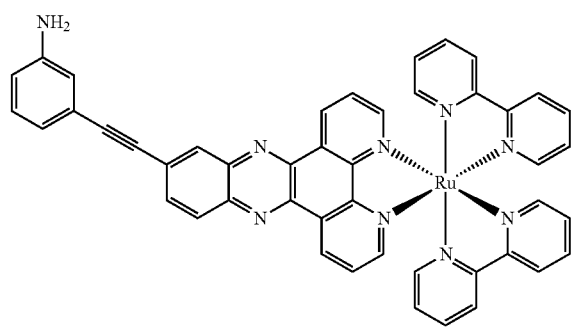
DRM1603
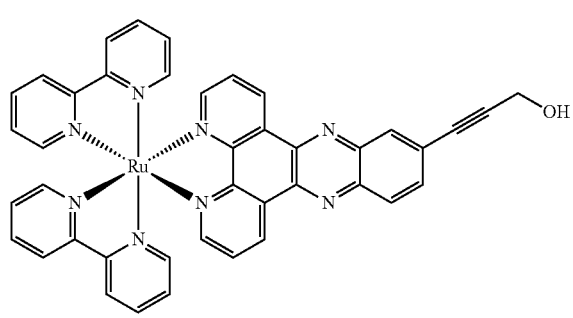
LRM1602
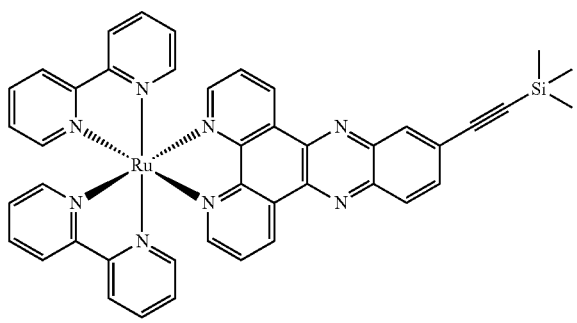
LRM1604

-continued
DRM1604
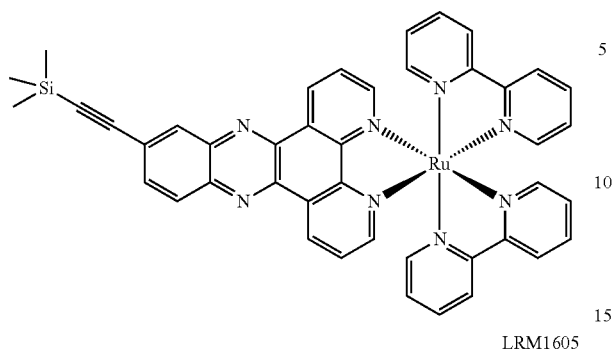
LRM1605
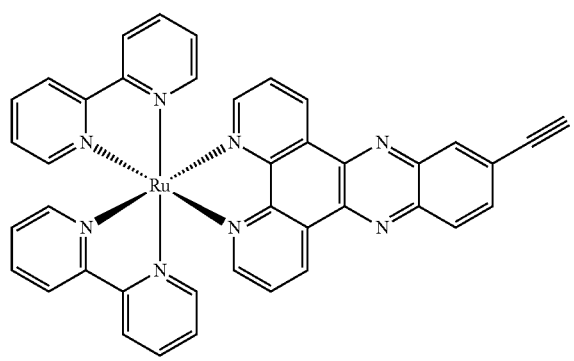
DRM1605
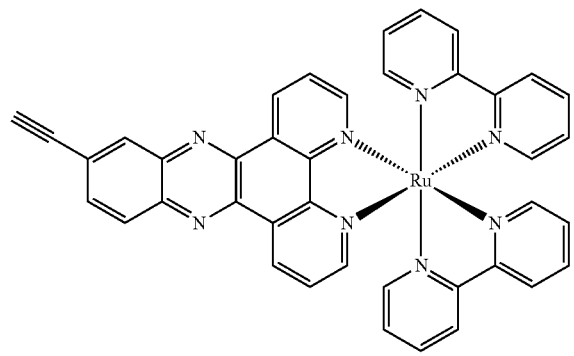
LRM1606
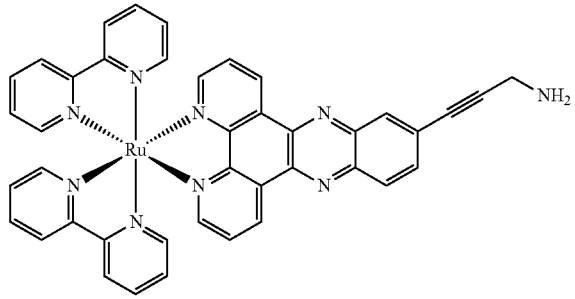
-continued
DRM1606
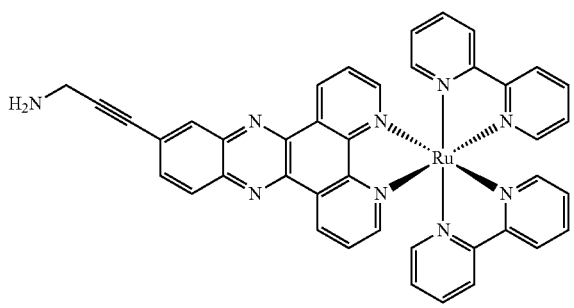
1.2.3. The Molecular Structure and Number of Racemic Phenanthroline DPPZ Alkynyl Ruthenium Complex
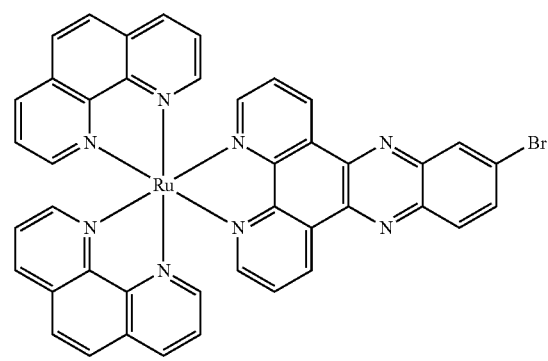
[Ru(phen)₂(BrDPPZ)]²⁺
RPM1601
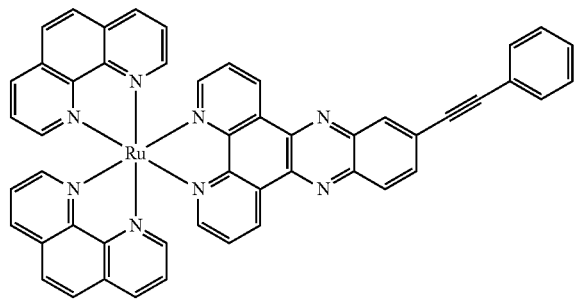
RPM1602
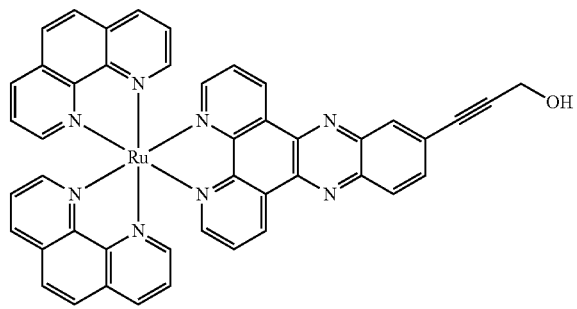

RPM1603
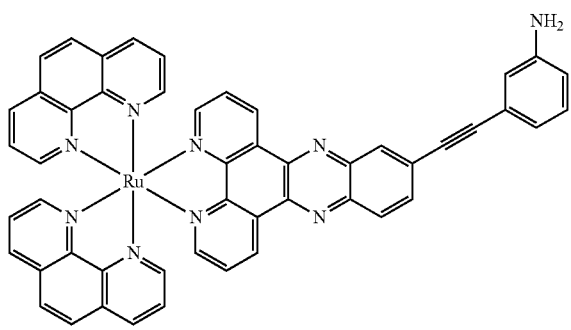
RPM1604
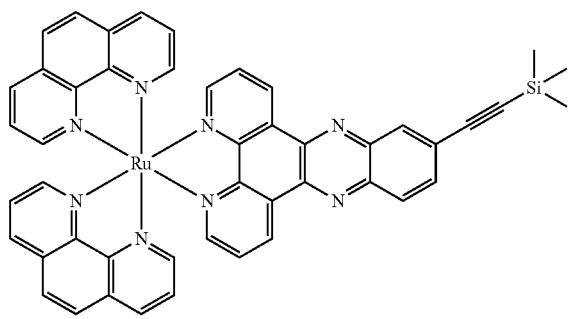
RPM1605
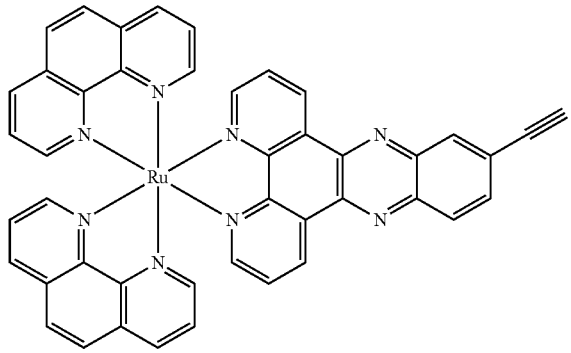
RPM1606
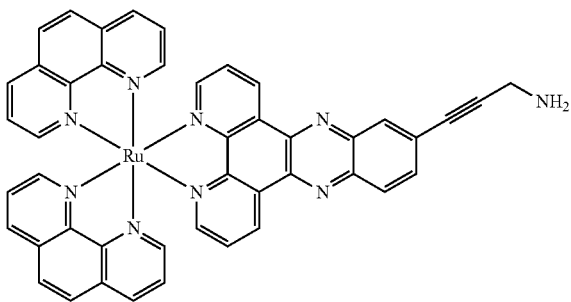
2. The Overall Synthesis Route of Alkynyl Modified Ruthenium(II) Complex with DPPZ as the Main Ligand
2.1. The Microwave Assisted Synthesis Route of Racemic Bipyridine DPPZ Alkynyl Complex
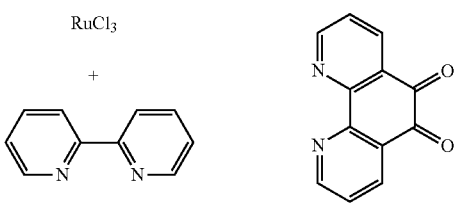
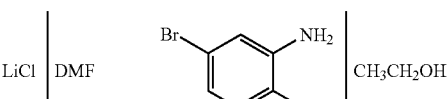
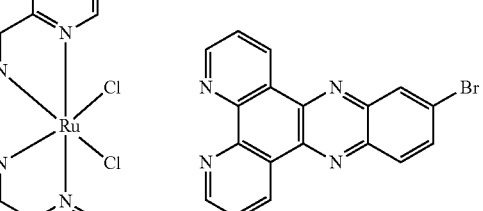
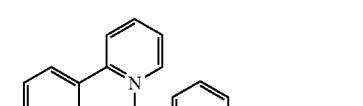
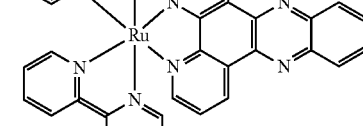

2.2 The Microwave Assisted Synthesis Route of Chiral Bipyridine DPPZ Alkynyl Complex
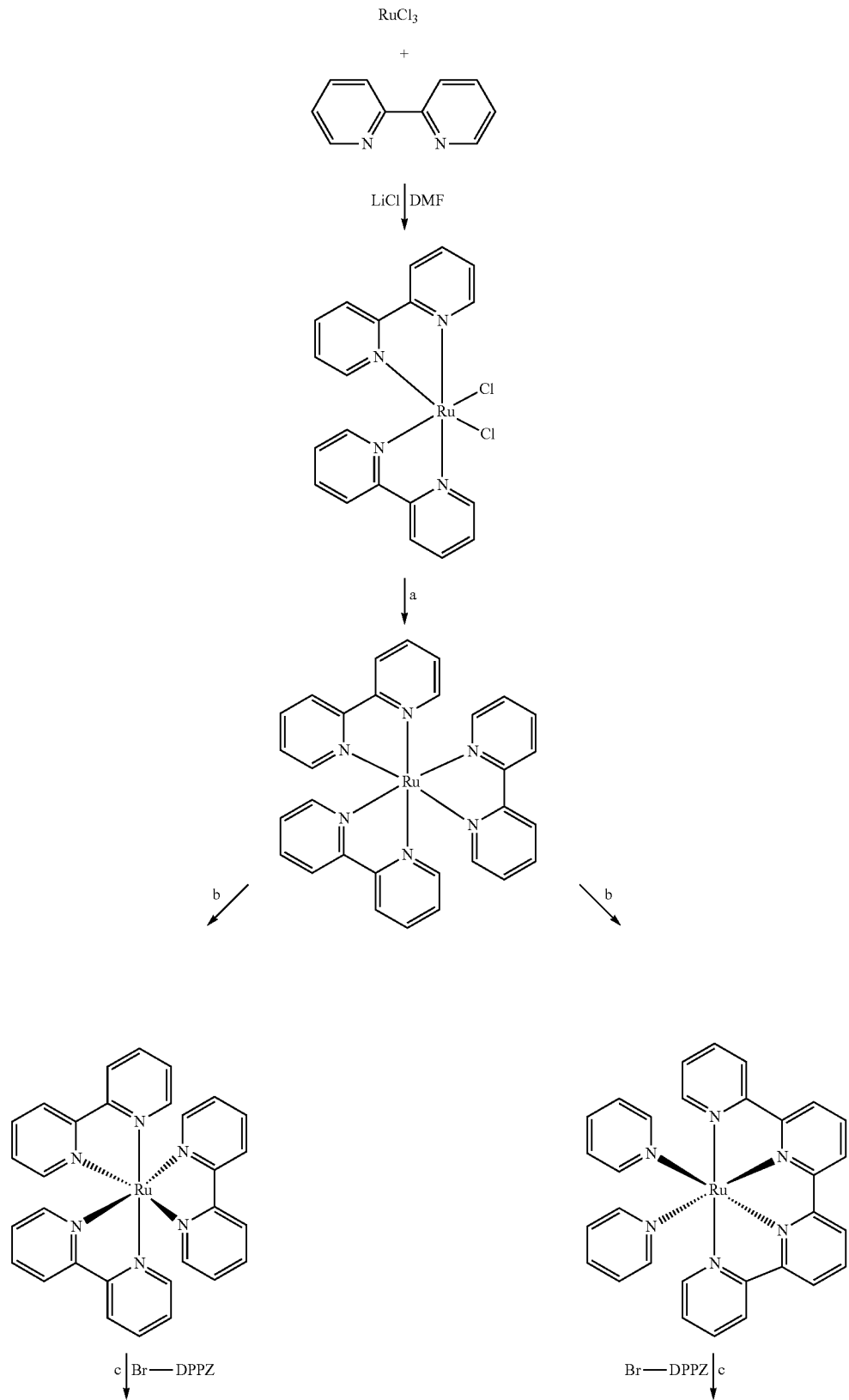

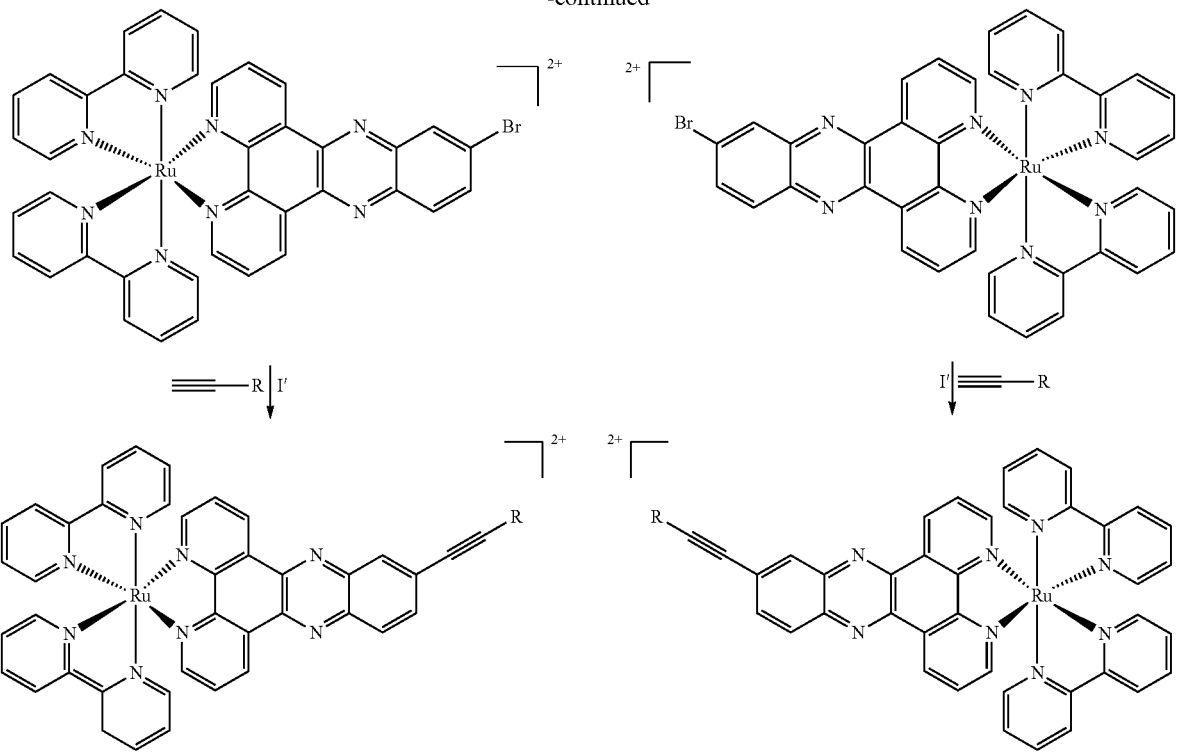

Description of Chiral Resolution

1) Synthesis of [Ru(bpy)$_2$Cl$_2$].2H$_2$O

Bipyridine (1.87 g, 12 mmol), lithium chloride (2.43 g, 57.6 mmol), and ruthenium trichloride (1.57 g, 6 mmol) were added into a 50 mL three-necked flask, then DMF and water were added, the reaction was performed by refluxing at 140° C. for 8 h under the protection of argon. After the reaction stopped, the reaction system was cooled to room temperature, then acetone was added, and black crystals were obtained by vacuum filtration; after washing a filter cake for several times with ice water and acetone, it was dried in a vacuum drier to obtain purple-black crystals with a yield of 75.5%. (Calculated with RuCl$_3$.3H$_2$O).

2) Synthesis of [Ru(bpy)$_2$(py)$_2$].2H$_2$O

[Ru(bpy)$_2$Cl$_2$].2H$_2$O (2.01 g, 3.85 mmol), pyridine and distilled water were added into a 150 mL three-necked flask, the reaction was performed by refluxing at 100° C. for 4 h under the protection of argon. After the reaction stopped, the reaction system was cooled to room temperature, all the solvent was evaporated under reduced pressure; afterwards, the resulting residue was dissolved in methanol to obtain a red solution, then ether was added, before performing vacuum filtration; after washing a filter cake for several times with ether, it was dried in a vacuum drier to obtain red crystals with a yield of 89.5%.

3) Synthesis of [Ru(bpy)$_2$(py)$_2$][o,o'-dibenzoyl-D-tartrate].12H$_2$O 1.95 g Cis-[Ru(bpy)$_2$(py)$_2$].Cl$_2$ was dissolved in water, 0.5 M O,O'-dibenzoyl D-sodium tartrate solution was added at room temperature (O,O'-dibenzoyl D-sodium tartrate solution was prepared by neutralizing O,O'-dibenzoyl D-tartaric acid with sodium hydroxide), stirring at room temperature for 25 min; after filtration, a filtrate was placed in a beaker for crystallizing in a fume hood. After ten days, a large amount of red crystals were precipitated. The crystals were washed for several times with ether and dried in a vacuum dryer to obtain red acicular crystals, with a yield of 45.8%.

4) Synthesis of [Ru(bpy)$_2$(py)$_2$][o,o'-dibenzoyl-L-tartrate].12H$_2$O 1.95 g Cis-[Ru(bpy)$_2$(py)$_2$].Cl$_2$ was dissolved in water, 0.5 M O,O'-dibenzoyl L-sodium tartrate solution was added at room temperature (O,O'-dibenzoyl L-sodium tartrate solution was prepared by neutralizing O,O'-dibenzoyl L-tartaric acid with sodium hydroxide), stirring at room temperature for 25 min; after filtration, a filtrate was placed in a beaker for crystallizing in a fume hood. After ten days, a large amount of red crystals were precipitated. The crystals were washed for several times with ether and dried in a vacuum dryer to obtain red acicular crystals, with a yield of 46.2%.

2.3. The Microwave Assisted Synthesis Route of Racemic Phenanthroline DPPZ Alkynyl Complex

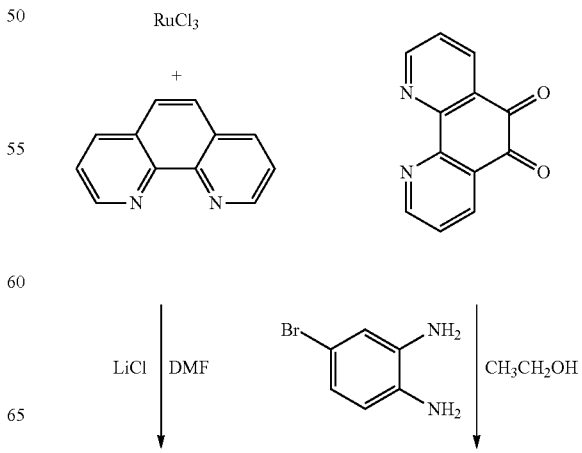

-continued

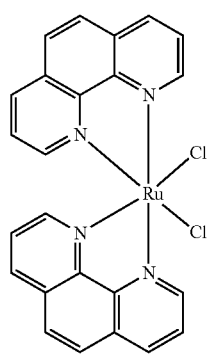 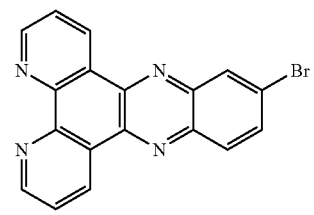

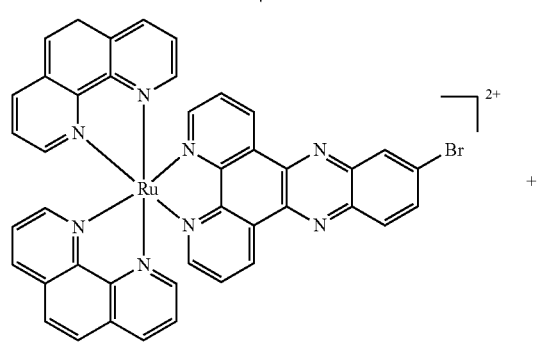

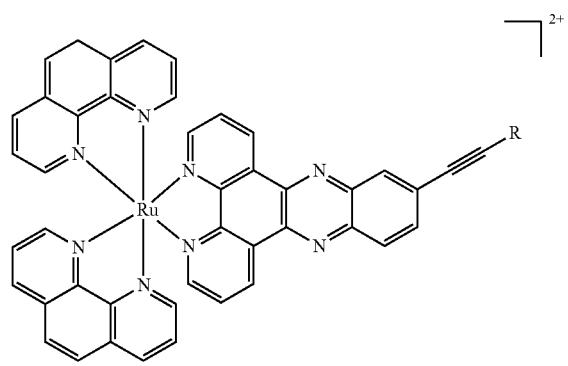

Example 1. Synthesis of a Ligand Br-DPPZ

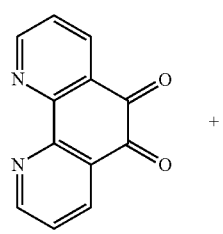 +

-continued

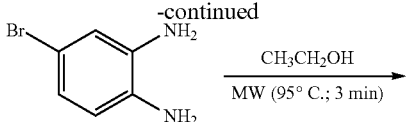

315.16 mg (1.5 mmol) o-phenanthroline 5,6-dione and 232.48 mg (1.25 mmol) 4-bromo-o-phenylenediamine were weighed and taken into a 30 ml quartz tube, and 20 ml absolute ethanol was added thereto, stirring for 5 minutes, and performing microwave reaction at 95° C. for 3 minutes. After the completion of the reaction, the reaction system was cooled to room temperature, 30 ml water was added, and a yellow-white solid was precipitated; after vacuum filtration, a filter cake was washed with water and dried in a vacuum drying oven at 50° C. The obtained crude product was dissolved in pure chloroform, packed in column with pure chloroform, and was purified by eluting with an eluent (pure chloroform:absolute ethanol=100:1). Afterwards, a main yellow band was collected and was subjected to rotary evaporation under reduced pressure to obtain a yellow solid, which was recrystallized with a solvent of absolute ethanol:chloroform=3:2, and a yield was 80%.

Example 2. Synthesis of $[Ru(bpy)_2(Br\text{-}DPPZ)]^{2+}$

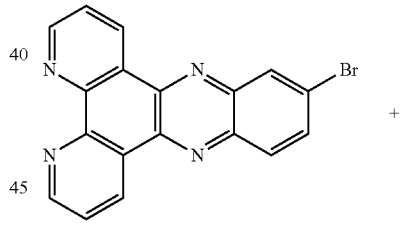

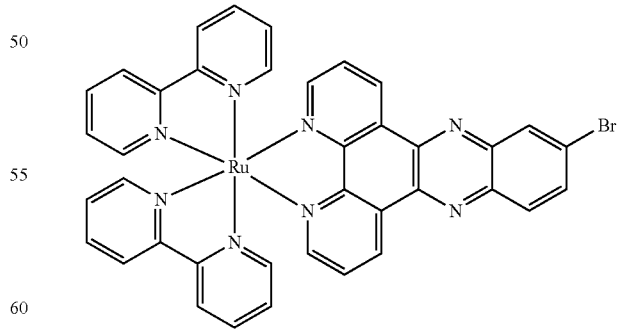

An appropriate ratio (1.5:1) of Br-DPPZ, [Ru(bpy)$_2$Cl$_2$].2H$_2$O and a 30 ml mixed solvent of ethylene glycol and water ($V_{ethylene\ glycol}$:$V_{water}$=9:1) were added into a 50 ml three-necked flask, heating and refluxing for reaction for 6 hours (T=120° C.). After the reaction stopped, the reaction system was cooled to room temperature, 80 ml water was added for dilution, and an orange red clear filtrate was obtained by filtration. An excess of NaClO₄ was added to the filtrate, so as to produce a large amount of orange red precipitate; after vacuum filtration, the precipitate was dried in a vacuum drier to obtain an orange yellow crude product. The crude product was dissolved in a small amount of acetonitrile, and purified and separated by a neutral alumina column, packed in column with acetonitrile. Appropriate ratio of acetonitrile was used to elute down a main red component, which was then subjected to rotary evaporation under reduced pressure and drying in a vacuum drier, so as to obtain red crystals with a yield of 80%.

Example 3. Synthesis of RM1601

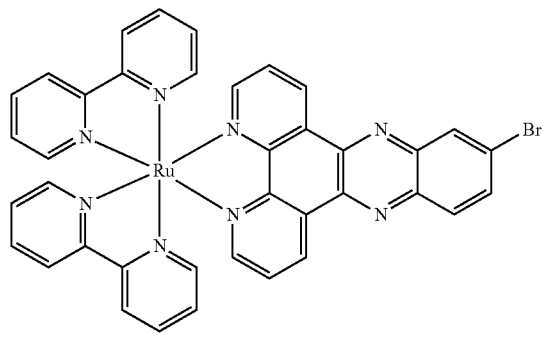

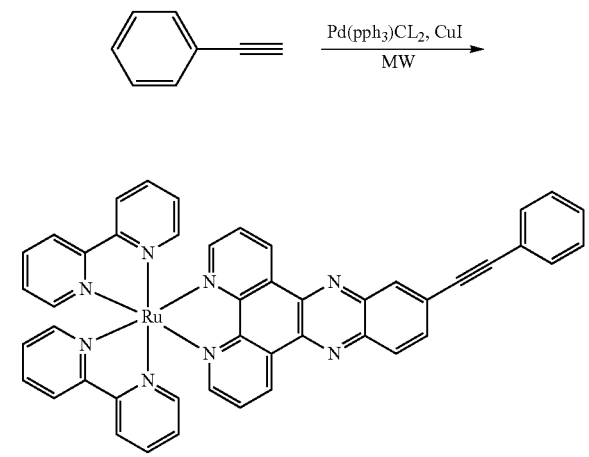

[Ru(bpy)$_2$(BrDPPZ)]$^{2+}$ (125 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and phenylacetylene (70 μL, 0.637 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with pure acetonitrile, thereby 4 bands being separated, wherein the first band was light yellow, the second band was dark reddish brown, the third band was light yellow, and the fourth band was dark reddish brown. Eluting with pure acetonitrile, the first and second bands were collected; eluting with a solvent of acetonitrile:methanol=50:1, the third band was collected, which was a target band; eluting with methanol, the fourth band was obtained. A solution of the target band was subjected to vacuum concentration to obtain a reddish brown solid, which was the target compound, with a yield of 31%.

Example 4. Synthesis of RM1602

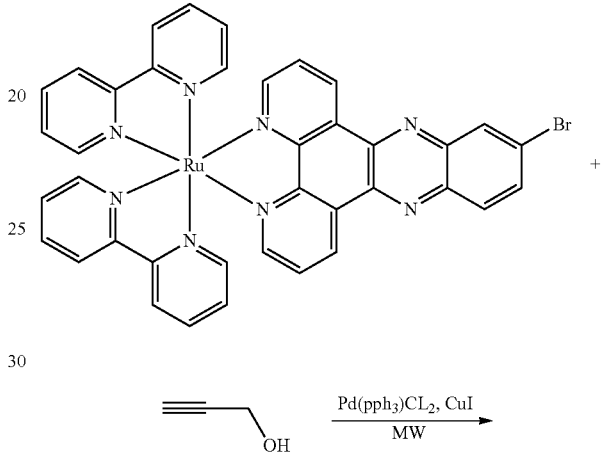

[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and propargyl alcohol (40 μL, 0.677 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with a solvent of acetonitrile:methanol=20:1, thereby 4 bands being separated, wherein the third band was a target band. A solution of the target band was subjected to vacuum concentration to obtain a reddish brown solid, which was the target compound, with a yield of 20%.

Example 5. Synthesis of RM1603

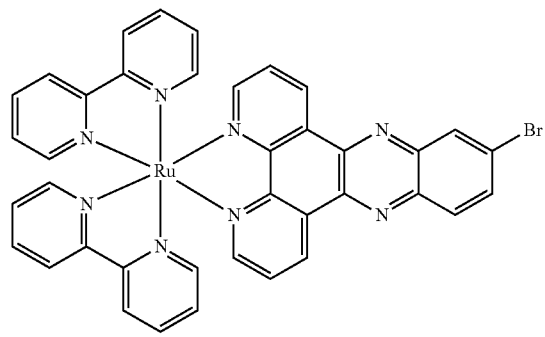

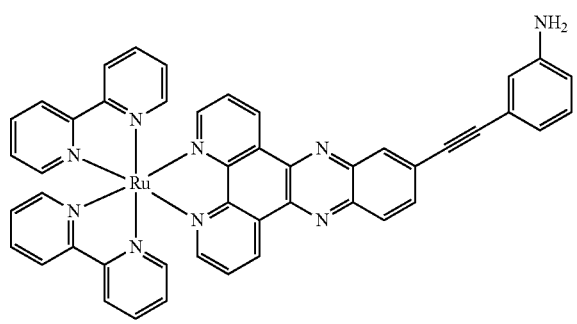

[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and 3-aminophenylacetylene (75 μL, 0.666 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with pure acetonitrile, thereby 3 bands being separated; eluting with a solvent of acetonitrile:methanol=30:1, the second band was collected, which was a target band. A solution of the target band was subjected to vacuum concentration to obtain a reddish brown solid, which was the target compound, with a yield of 35%.

Example 6. Synthesis of RM1604

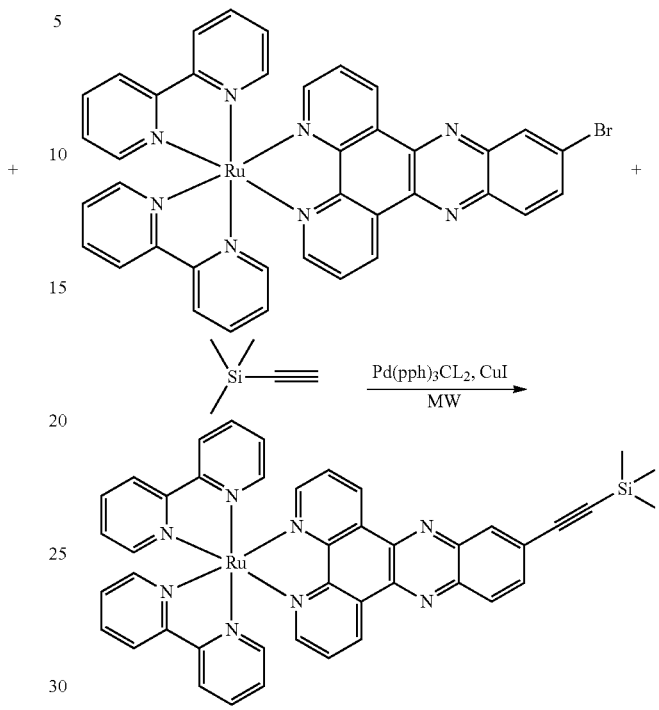

[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and trimethylsilylacetylene (95 μL, 0.672 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with a solvent of acetonitrile:toluene=1:1, thereby 4 bands being separated, eluting to collect the first band, which was a target band. A solution of the target band was subjected to vacuum concentration to obtain a reddish brown solid, which was the target compound, with a yield of 32%.

Example 7. Synthesis of L Ru(bpy)$_2$(Br-DPPZ)

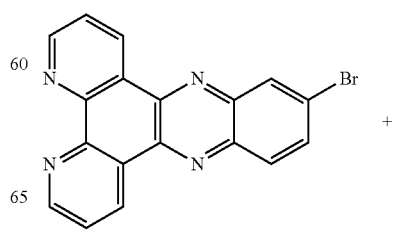

-continued

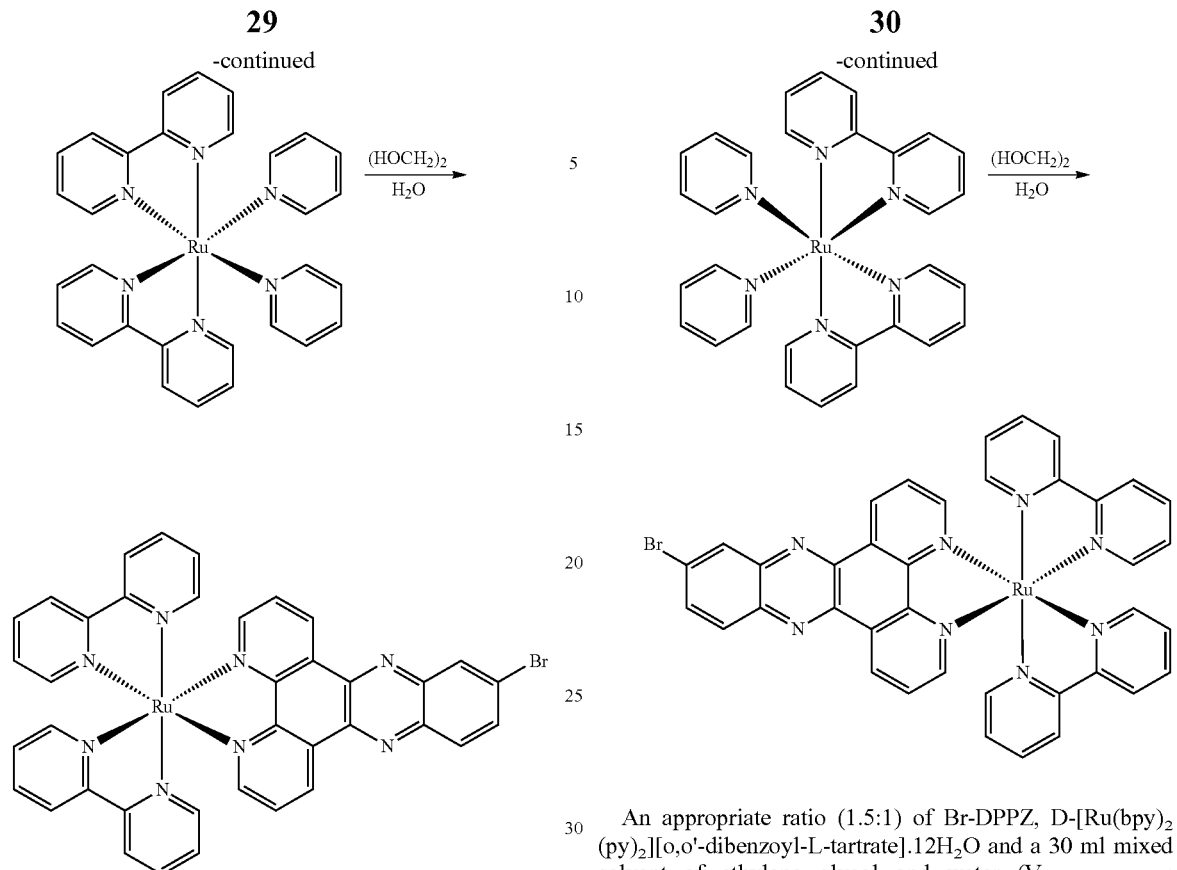

An appropriate ratio (1.5:1) of Br-DPPZ, L-[Ru(bpy)$_2$ (py)$_2$][o,o'-dibenzoyl-L-tartrate].12H$_2$O and a 30 ml mixed solvent of ethylene glycol and water (V$_{ethylene\ glycol}$:V$_{water}$=9:1) were added into a 50 mL three-necked flask, heating and refluxing for reaction for 6 hours (T=120° C.). After the reaction stopped, the reaction system was cooled to room temperature, 80 ml water was added for dilution, and an orange red clear filtrate was obtained by filtration. An excess of NaClO$_4$ was added to the filtrate, so as to produce a large amount of orange red precipitate; after vacuum filtration, the precipitate was dried in a vacuum drier to obtain an orange yellow crude product. The crude product was dissolved in a small amount of acetonitrile, and purified and separated by a neutral alumina column, packed in column with acetonitrile. The acetonitrile was used to elute down a main red component, which was then subjected to rotary evaporation under reduced pressure and drying in a vacuum drier, so as to obtain red crystals with a yield of 30%.

Example 8. Synthesis of D Ru(bpy)$_2$(Br-DPPZ)

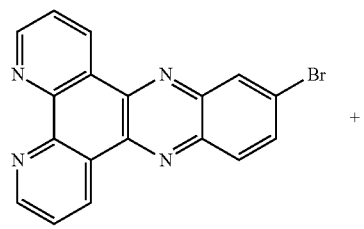

An appropriate ratio (1.5:1) of Br-DPPZ, D-[Ru(bpy)$_2$ (py)$_2$][o,o'-dibenzoyl-L-tartrate].12H$_2$O and a 30 ml mixed solvent of ethylene glycol and water (V$_{ethylene\ glycol}$:V$_{water}$=9:1) were added into a 50 mL three-necked flask, heating and refluxing for reaction for 6 hours (T=120° C.). After the reaction stopped, the reaction system was cooled to room temperature, 80 ml water was added for dilution, and an orange red clear filtrate was obtained by filtration. An excess of NaClO$_4$ was added to the filtrate, so as to produce a large amount of orange red precipitate; after vacuum filtration, the precipitate was dried in a vacuum drier to obtain an orange yellow crude product. The crude product was dissolved in a small amount of acetonitrile, and purified and separated by a neutral alumina column, packed in column with acetonitrile. An appropriate ratio of acetonitrile was used to elute down a main red component, which was then subjected to rotary evaporation under reduced pressure and drying in a vacuum drier, so as to obtain red crystals with a yield of 40%.

Example 9. Synthesis of LRM1601

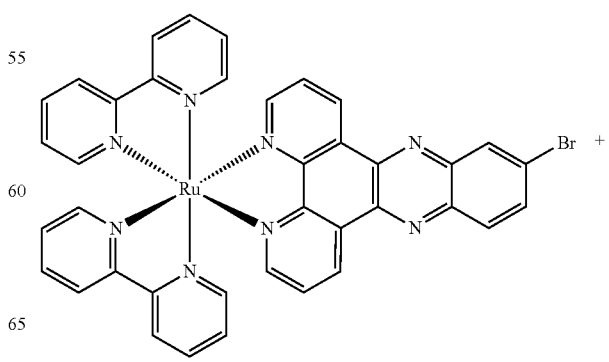

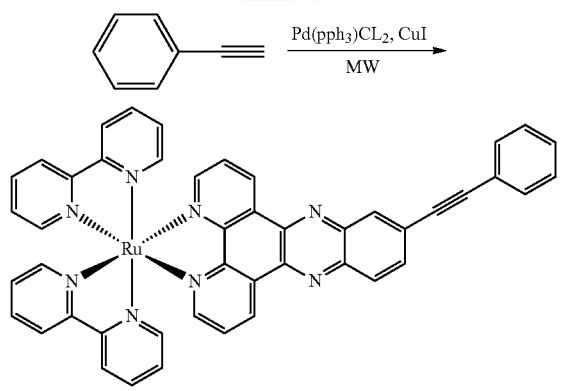

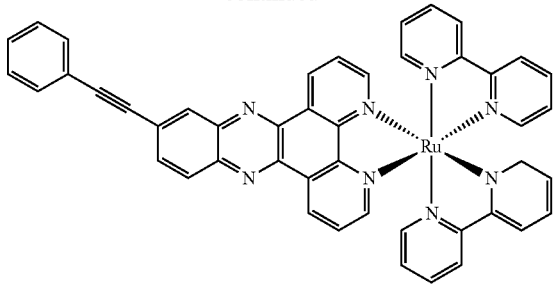

L[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and phenylacetylene (70 μL, 0.637 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with pure acetonitrile, thereby 4 bands being separated, wherein the first band was light yellow, the second band was dark reddish brown, the third band was light yellow, and the fourth band was dark reddish brown. Eluting with pure acetonitrile, the first and second bands were collected; eluting with a solvent of acetonitrile:methanol=50:1, the third band was collected, which was a target band; eluting with methanol, the fourth band was obtained. A solution of the target band was subjected to vacuum concentration to obtain a reddish brown solid, which was the target compound, with a yield of 35%.

Example 10. Synthesis of DRM1601

D[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and phenylacetylene (70 μL, 0.637 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with pure acetonitrile, thereby 4 bands being separated, wherein the first band was light yellow, the second band was dark reddish brown, the third band was light yellow, and the fourth band was dark reddish brown. Eluting with pure acetonitrile, the first and second bands were collected; eluting with a solvent of acetonitrile:methanol=50:1, the third band was collected, which was a target band; eluting with methanol, the fourth band was obtained. A solution of the target band was subjected to vacuum concentration to obtain a reddish brown solid, which was the target compound, with a yield of 50%.

Example 11. Synthesis of LRM1602

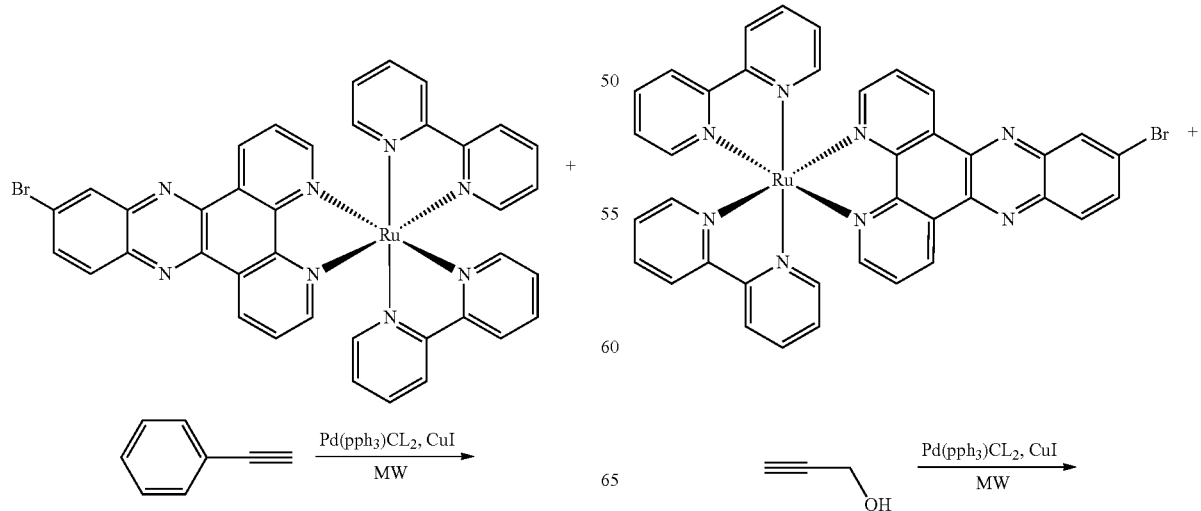

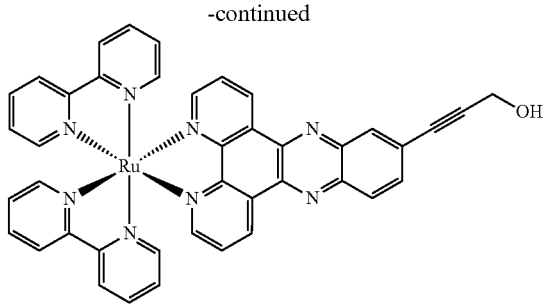

L[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and propargyl alcohol (40 μL, 0.677 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with a solvent of acetonitrile:methanol=20:1, thereby 4 bands being separated, wherein the third band was a target band. A solution of the target band was subjected to vacuum concentration to obtain a reddish brown solid, which was the target compound, with a yield of 12%.

Example 12. Synthesis of DRM1602

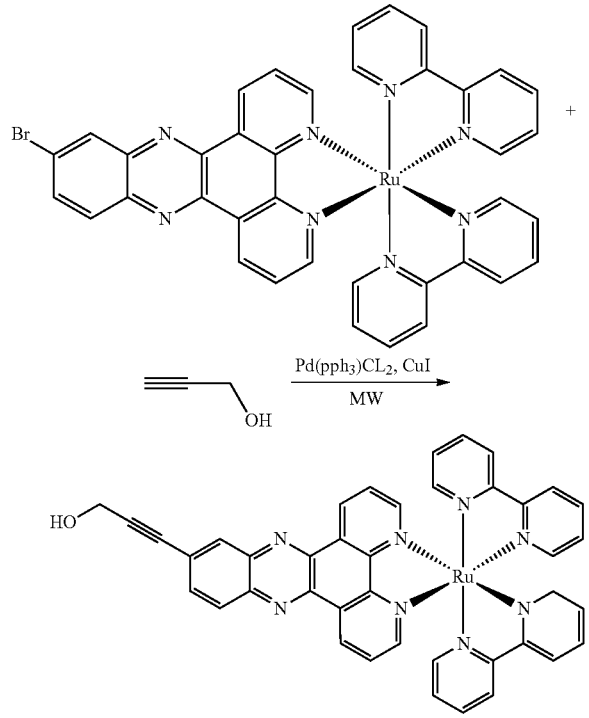

D[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and propargyl alcohol (40 μL, 0.677 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with a solvent of acetonitrile:methanol=20:1, thereby 4 bands being separated, wherein the third band was a target band. A solution of the target band was subjected to vacuum concentration to obtain a reddish brown solid, which was the target compound, with a yield of 15%.

Example 13. Synthesis of LRM1603

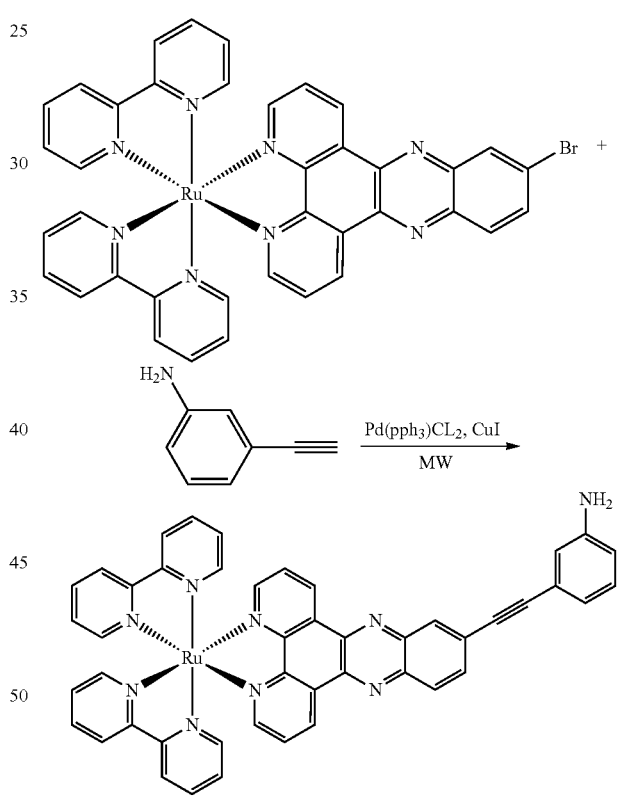

L[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and 3-aminophenylacetylene (75 μL, 0.666 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with pure acetonitrile, thereby 3 bands being separated; eluting with a solvent of acetonitrile:methanol=30:1, the second band was collected, which was a target band. A solution of the target band was subjected to vacuum concentration to obtain a reddish brown solid, which was the target compound, with a yield of 36%.

Example 14. Synthesis of DRM1603

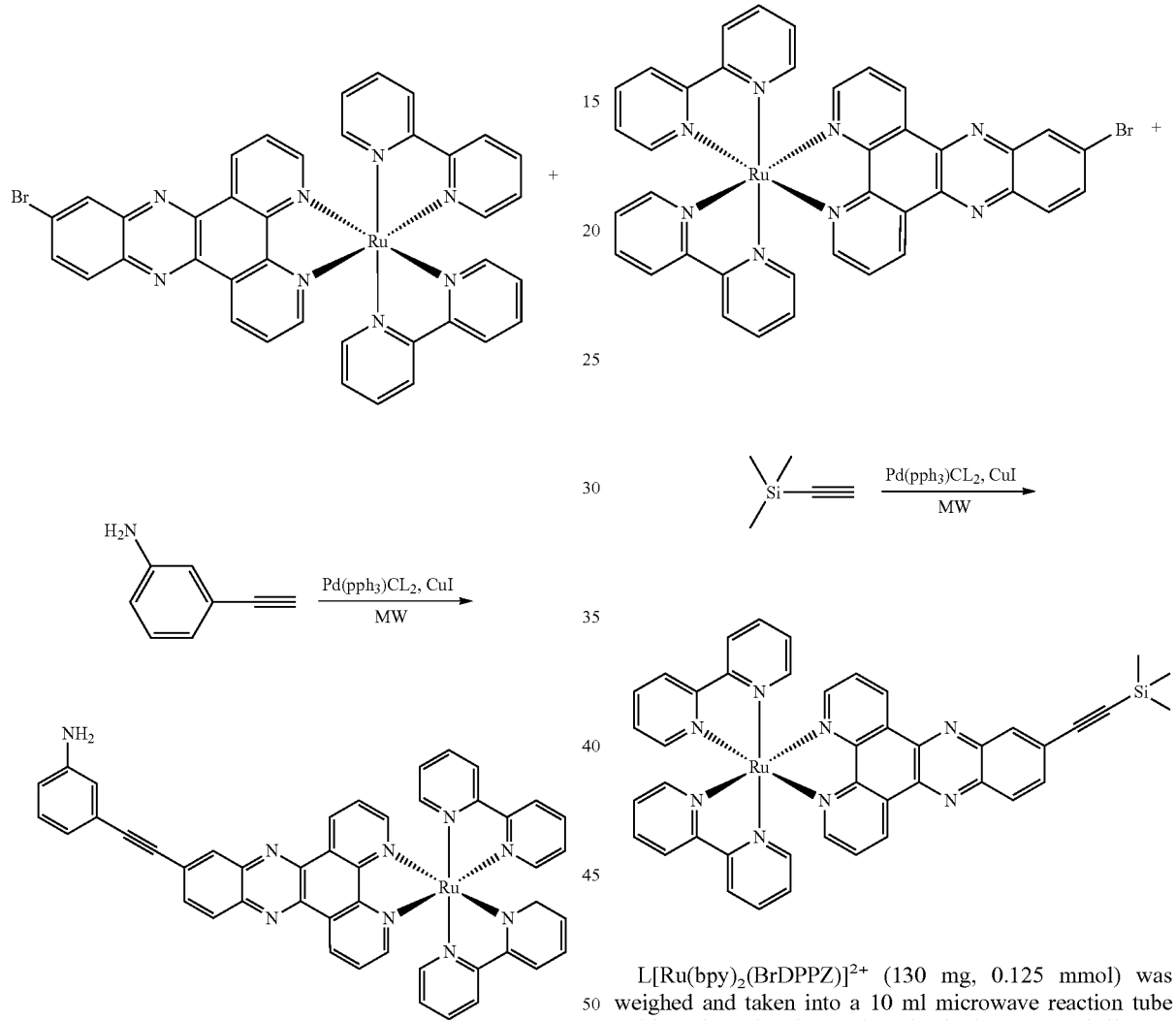

D[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and 3-aminophenylacetylene (75 μL, 0.666 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with pure acetonitrile, thereby 3 bands being separated; eluting with a solvent of acetonitrile:methanol=30:1, the second band was collected, which was a target band. A solution of the target band was subjected to vacuum concentration to obtain a reddish brown solid, which was the target compound, with a yield of 36%.

Example 15. Synthesis of LRM1604

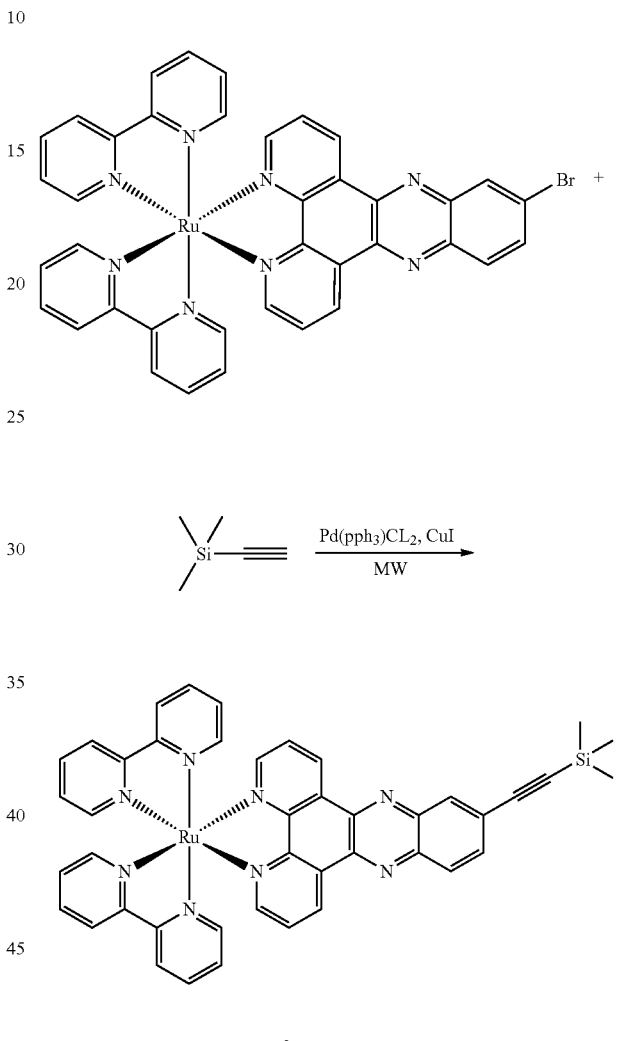

L[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and trimethylsilylacetylene (95 μL, 0.672 μmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with a solvent of acetonitrile:toluene=1:1, thereby 4 bands being separated, eluting to collect the first band, which was a target band. A solution of the target band was subjected to vacuum concentration to obtain a reddish brown solid, which was the target compound, with a yield of 33%.

Example 16. Synthesis of DRM1604

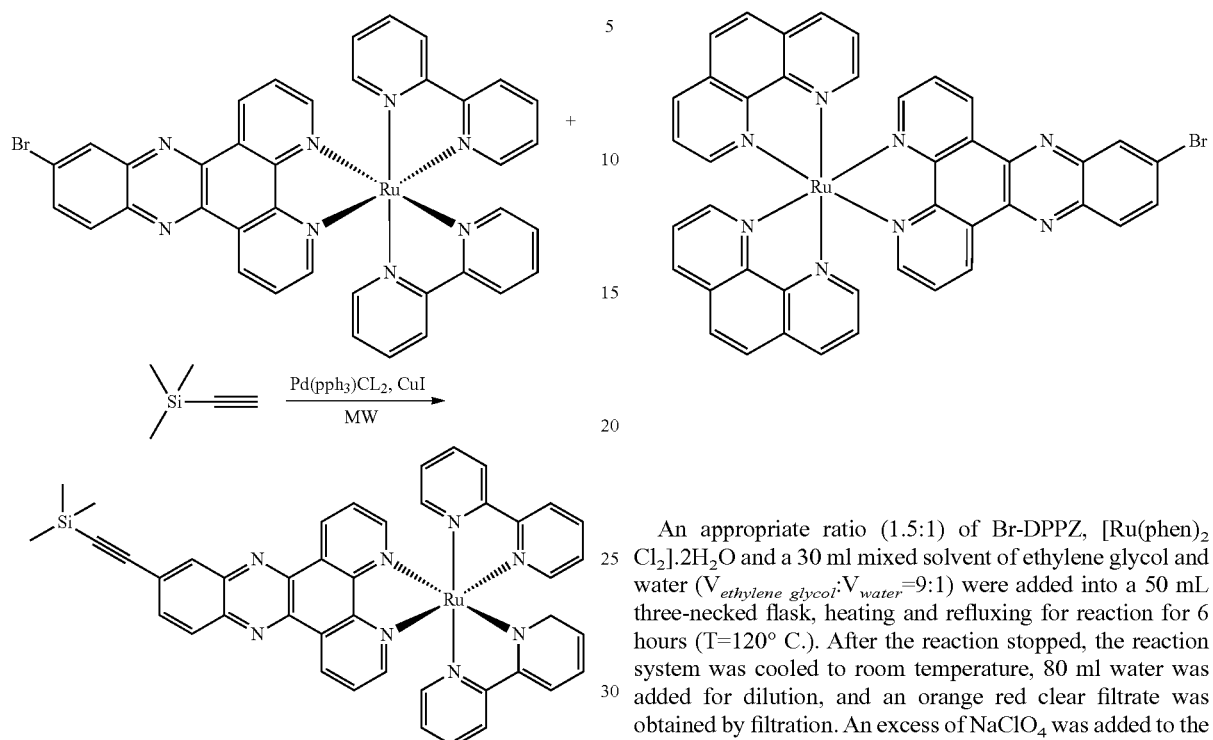

D[Ru(bpy)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 µL, 0.501 µmol) and trimethylsilylacetylene (95 µL, 0.672 µmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with a solvent of acetonitrile:toluene=1:1, thereby 4 bands being separated, eluting to collect the first band, which was a target band. A solution of the target band was subjected to vacuum concentration to obtain a reddish brown solid, which was the target compound, with a yield of 35%.

Example 17. Synthesis of [Ru(phen)$_2$(Br-DPPZ)]$^{2+}$

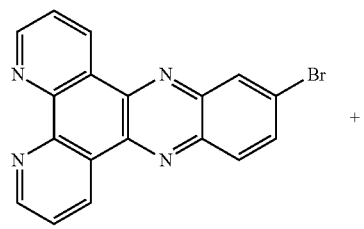

An appropriate ratio (1.5:1) of Br-DPPZ, [Ru(phen)$_2$Cl$_2$].2H$_2$O and a 30 ml mixed solvent of ethylene glycol and water (V$_{ethylene\ glycol}$:V$_{water}$=9:1) were added into a 50 mL three-necked flask, heating and refluxing for reaction for 6 hours (T=120° C.). After the reaction stopped, the reaction system was cooled to room temperature, 80 ml water was added for dilution, and an orange red clear filtrate was obtained by filtration. An excess of NaClO$_4$ was added to the filtrate, so as to produce a large amount of orange red precipitate; after vacuum filtration, the precipitate was dried in a vacuum drier to obtain an orange yellow crude product. The crude product was dissolved in a small amount of acetonitrile, and purified and separated by a neutral alumina column, packed in column with acetonitrile. An appropriate ratio of acetonitrile was used to elute down a main red component, which was then subjected to rotary evaporation under reduced pressure and drying in a vacuum drier, so as to obtain red crystals with a yield of 60%.

Example 18. Synthesis of RPM1601

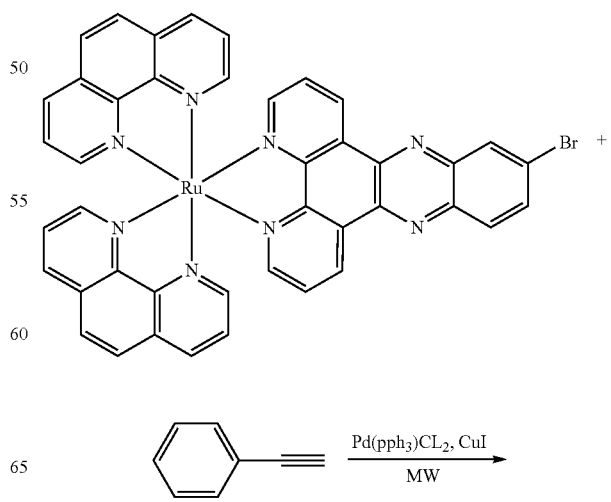

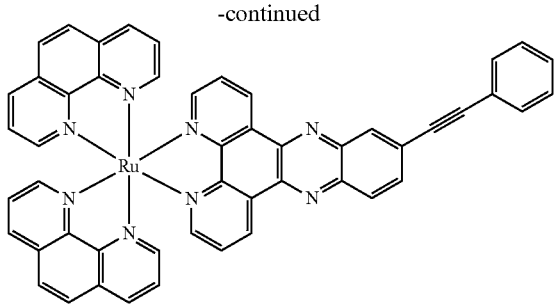

[Ru(phen)₂(BrDPPZ)]²⁺ (125 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and phenylacetylene (70 μL, 0.637 μmol) were added, and then the catalyst Pd(PPh₃)₂Cl₂ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with pure acetonitrile, the first band was a target band. A solution of the target band was subjected to vacuum concentration to obtain a reddish brown solid, which was the target compound, with a yield of 33%.

Example 19. Synthesis of RPM1602

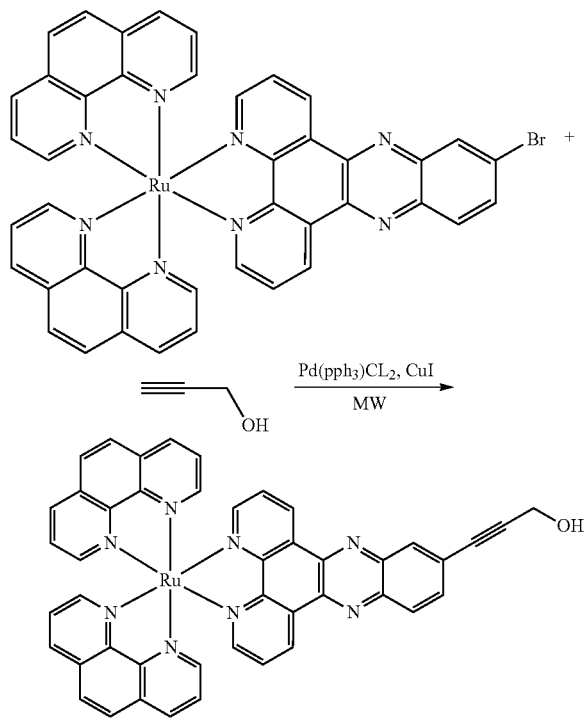

[Ru(phen)₂(BrDPPZ)]²⁺ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and propargyl alcohol (40 μL, 0.677 μmol) were added, and then the catalyst Pd(PPh₃)₂Cl₂ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with a solvent of acetonitrile:methanol=20:1, thereby 4 bands being separated, wherein the third band was a target band. A solution of the target band was subjected to vacuum concentration to obtain a reddish brown solid, which was the target compound, with a yield of 20%.

Example 20. Synthesis of RPM1603

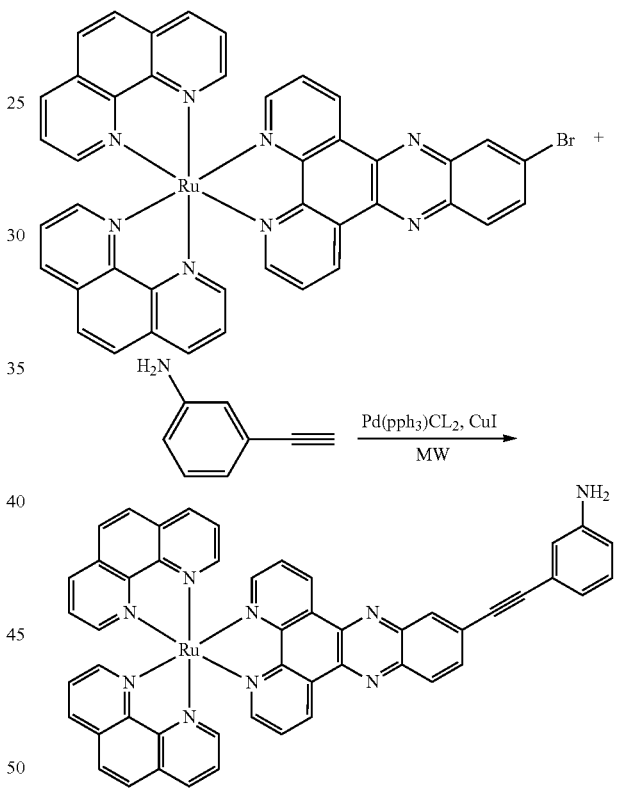

[Ru(phen)₂(BrDPPZ)]²⁺ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 μL, 0.501 μmol) and 3-aminophenylacetylene (95 μL, 0.672 μmol) were added, and then the catalyst Pd(PPh₃)₂Cl₂ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with pure acetonitrile, thereby 3 bands being separated; eluting with a solvent of acetonitrile:methanol=30:1, the second band was collected, which was a target band. A solution of the target band was subjected to vacuum concentration to obtain a reddish brown solid, which was the target compound, with a yield of 45%.

Example 21. Synthesis of RPM1604

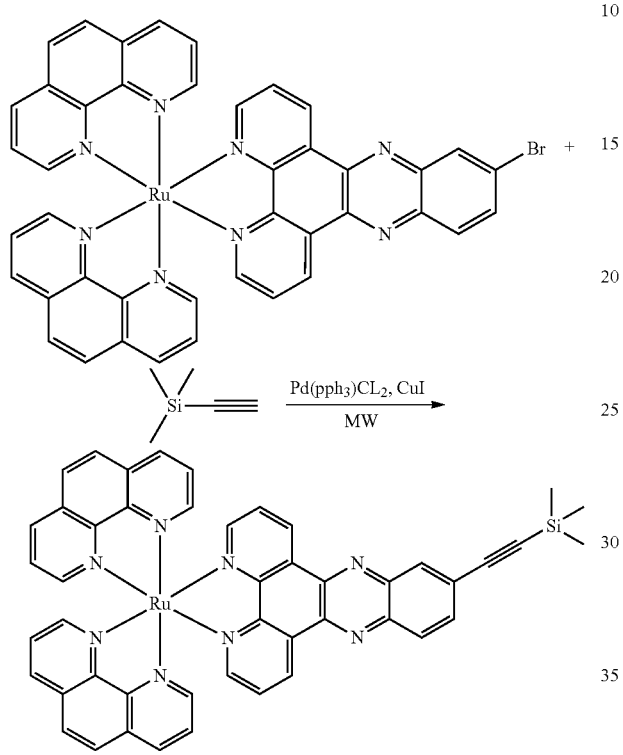

[Ru(phen)$_2$(BrDPPZ)]$^{2+}$ (130 mg, 0.125 mmol) was weighed and taken into a 10 ml microwave reaction tube (with a stirrer therein), and 5 ml anhydrous acetonitrile was added thereto, ultrasonic processing for complete dissolution. Afterwards, under the protection of nitrogen, appropriate amount of triethylamine (70 µL, 0.501 µmol) and trimethylsilylacetylene (95 µL, 0.672 µmol) were added, and then the catalyst Pd(PPh$_3$)$_2$Cl$_2$ (17.6 mg) and CuI (20 mg) were quickly added; after being airtight, it was put into a microwave reactor for microwave assisted heating at 140° C. for 30 min. After the completion of the reaction, the reaction system was cooled to room temperature, and was subjected to filtration to obtain a filtrate. The filtrate was purified by a neutral alumina column, eluting with a solvent of acetonitrile:toluene=1:1, thereby 4 bands being separated, eluting to collect the second band, which was a target band. A solution of the target band was subjected to vacuum concentration to obtain a reddish brown solid, which was the target compound, with a yield of 32%.

Example 22. Inhibitory Effect of the Ruthenium Complex Containing Alkynyl Group on MDA-MB-231 Cells The Ruthenium complex containing alkynyl group in 1 mM stock solution was dissolved in DMSO, cell viability was measured by measuring the ability of cells to convert MTT into purple formazan dye. The cells were seeded in a 96-well plate for tissue culture for 24 hours, and then the cells were incubated with different concentrations of the complexes for 72 hours; at a higher temperature, 20 mL/well of MTT solution (5 mg/mL phosphate buffered saline) was added, and incubated for 5 hours. A microplate spectraphotometer (SpectroAmaxt250) was used to measure the color intensity of the formazan solution that reflects the cell growth conditions at 570 nm. The inhibitory effect of different Ruthenium complexes containing alkynyl group on MDA-MB-231 cells are shown in Table 1, wherein DRM1601 and DRM1603 have a good inhibitory effect on breast cancer cell line MDA-MB-231, especially the IC$_{50}$ value of DRM1603 to MDA-MB-231 reaches 3.5±0.14 µM.

TABLE 1

Inhibitory effect of different Ruthenium complexes containing alkynyl group on MDA-MB-231 cells

| Comp. | IC$_{50}$/µM MDA-MB-231 |
|---|---|
| LRM1601 | 35.95 ± 1.6 |
| LRM1602 | 382.5 ± 23 |
| LRM1603 | 53.5 ± 1.7 |
| DRM1601 | 9.8 ± 0.2 |
| DRM1602 | 162.6 ± 10.5 |
| DRM1603 | 3.5 ± 0.14 |

Example 23. A Use of the Ruthenium Complex Containing Alkynyl Group as a Fluorescence Probe In a complete growth medium with 5×10$^4$ cells per ml, MDA-MB-231 cells were incubated with RM1601 (20 µM) at 37° C. for 72 hours. The cells were washed for three times with phosphate buffered saline (PBS), fixed with 4% paraformaldehyde, and labeled with 4',6-diamidino-2-phenylindole (DAPI; 0.5 µg/mL). A laser scanning confocal microscope was used to observe the fluorescence property of compound RM1601 and its localization in the cells; the results are shown in FIG. 1. The Ruthenium complex RM1601 containing alkynyl group was excited at 400-500 nm, it can be observed that the cells containing RM1601 emit red fluorescence; after 72 hours of treatment of RM1601 and MDA-MB-231 cells, it was found that RM1601 was mainly located in the cell nucleus. Therefore, the Ruthenium complex containing alkynyl group provided by the present invention can be used as a fluorescence probe for the cell nucleus.

Specific embodiments of the present invention have been described above, but the specific embodiments are only used as examples and should not be taken as limitation. Those skilled in the art should be able to understand that any equivalent modifications and substitutions to the present invention are within the scope of the present invention. Therefore, without departing from the spirit and the scope of the present invention, a variety of equivalent changes and modifications should be within the scope of the present invention.

What is claimed is:

1. A method of synthesizing a Ruthenium complex containing an alkynyl group, comprising the following steps:
   S1: adding Br-DPPZ, [Ru(L)$_2$Cl$_2$].nH$_2$O or L-[Ru(L)$_2$(py)$_2$].mH$_2$O or D-[Ru(L)$_2$(py)$_2$].mH$_2$O and a mixed solvent to a reaction vessel to obtain a first mixed solution; afterwards, heating and refluxing the first mixed solution for a first reaction to obtain a first resulting product, when the first reaction is complete, post-processing the first resulting product to obtain an intermediate; wherein py represents pyridine, and each of n and m is an integer, independently;

S2: adding the intermediate prepared in S1 into a microwave reaction tube, and adding anhydrous acetonitrile to the intermediate to obtain a mixture, and performing an ultrasonic treatment on the mixture to dissolve the intermediate to obtain a second mixed solution; afterwards, under a protection of an inert gas, first adding triethylamine and

and then immediately adding Pd(PPh$_3$)$_2$Cl$_2$ and CuI to the second mixed solution; after sealing the microwave reaction tube, putting the microwave reaction tube into a microwave reactor for a microwave assisted heating for a second reaction to obtain a second resulting product, and when the second reaction is complete, post-processing the second resulting product to obtain the Ruthenium complex containing the alkynyl group, wherein a chemical formula of the Ruthenium complex containing the alkynyl group is Ru(L)$_2$(DPPZ'), wherein L is an auxiliary ligand with N as coordinating atom, and DPPZ' is a main ligand having structural formula (I) as follows:

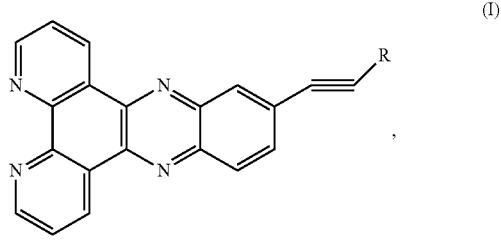

wherein

R is any one selected from the group consisting of H, substituted phenyl, unsubstituted phenyl, R$_1$NH$_2$, R$_1$OH, and SiMe$_3$, wherein R$_1$ is a C1-C5 chain alkyl group.

2. The method according to claim 1, wherein the mixed solvent is ethylene glycol and water in S1.

3. The method according to claim 2, wherein a volume ratio of the ethylene glycol and the water is 9:1 in S1.

4. The method according to claim 1, wherein the inert gas is nitrogen or argon in S2.

* * * * *